(12) United States Patent
Muller et al.

(10) Patent No.: US 9,955,143 B2
(45) Date of Patent: Apr. 24, 2018

(54) AUTOSTEREOSCOPIC DISPLAYS

(71) Applicant: SoliDDD Corp., Brooklyn, NY (US)

(72) Inventors: Richard A. Muller, Berkeley, CA (US); Neal I. Weinstock, Brooklyn, NY (US)

(73) Assignee: SOLIDDD CORP., Brooklyn, NY (US)

( * ) Notice: Subject to any disclaimer, the term of this patent is extended or adjusted under 35 U.S.C. 154(b) by 400 days.

(21) Appl. No.: 14/247,979

(22) Filed: Apr. 8, 2014

(65) Prior Publication Data

US 2014/0300714 A1  Oct. 9, 2014

Related U.S. Application Data

(60) Provisional application No. 61/810,250, filed on Apr. 9, 2013.

(51) Int. Cl.
*H04N 13/04* (2006.01)

(52) U.S. Cl.
CPC ..... *H04N 13/0404* (2013.01); *H04N 13/0409* (2013.01); *H04N 13/0422* (2013.01); *H04N 13/0447* (2013.01)

(58) Field of Classification Search
CPC ........... H04N 13/0404; H04N 13/0409; H04N 13/0422; H04N 13/0447
USPC .......................... 348/54, 42, 51, 52; 382/297
See application file for complete search history.

(56) References Cited

U.S. PATENT DOCUMENTS

| | | | |
|---|---|---|---|
| 4,829,365 A | 5/1989 | Eichenlaub | |
| 2005/0083246 A1 | 4/2005 | Saishu et al. | |
| 2006/0170616 A1* | 8/2006 | Hirayama | G02B 27/2214 345/32 |
| 2010/0118218 A1* | 5/2010 | Eichenlaub | G02B 27/2214 349/15 |
| 2011/0096156 A1 | 4/2011 | Kim et al. | |
| 2011/0164318 A1 | 7/2011 | Yun et al. | |
| 2013/0002974 A1* | 1/2013 | Minato | G02B 5/201 349/43 |
| 2013/0058563 A1* | 3/2013 | Yoshida | H04N 13/0011 382/154 |
| 2013/0100175 A1* | 4/2013 | Koito | H04N 13/0409 345/690 |

(Continued)

FOREIGN PATENT DOCUMENTS

| | | |
|---|---|---|
| EP | 1796401 A1 | 6/2007 |
| EP | 1853072 A2 | 11/2007 |

OTHER PUBLICATIONS

International Search Report for Application PCT/US2014/033298, dated Jul. 25, 2014, 6 pages, European Patent Office, The Hague, Netherlands.

*Primary Examiner* — Farzana Hossain
(74) *Attorney, Agent, or Firm* — Ference & Associates LLC

(57) ABSTRACT

An aspect provides a method of modifying a display including a plurality of pixels wherein each of the pixels is less than twice as tall as the pixel is wide includes modifying the display to create a plurality of modified pixels wherein each of the modified pixels is at least twice as tall as the modified pixel is wide, comprising at least one of a) masking of at least a portion of the display, b) optically shifting a perceived position of at least one row of sub-pixels of the display, and c) changing the addressing of sub-pixels of the display. Other aspects are described and claimed.

32 Claims, 19 Drawing Sheets

(56) References Cited

U.S. PATENT DOCUMENTS

2013/0113783 A1* 5/2013 Pourbigharaz ..... H04N 13/0409
345/419

* cited by examiner

AUTOSTEREOSCOPIC DISPLAYS

CLAIM FOR PRIORITY

This application claims the benefit of prior U.S. Provisional Patent Application Ser. No. 61/810,250 entitled "AUTOSTEREOSCOPIC DISPLAYS", filed on Apr. 9, 2013, the contents of which are incorporated by reference in their entirety herein.

FIELD

In a number of embodiments, devices, systems and methods hereof relate generally to autostereoscopic displays, and, for example, to autostereoscopic displays with significantly improved resolution.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding the technologies or the background thereof. The disclosure of all references cited herein are incorporated by reference.

Conventional autostereoscopic displays use arrays of lenses or parallax barriers or other view selectors to make a number of pixels of the display visible to one eye of a viewing person and to make a number of other pixels of the display visible to the other eye of the viewing person. By isolating the pixels of the display visible to each eye, the two components of a stereoscopic image can be presented on the display.

Since an ordinary viewer's eyes are side-by-side and aligned horizontally, the array of lenses makes pixels visible according to horizontal orientation. As a result, corresponding pixels for the left and right eyes are located in the same scanline and displaced from one another horizontally.

Each eye of the viewer therefore sees an image whose horizontal resolution is halved in an autostereoscopic displays having only two views. In most autostereoscopic displays, field of view is improved by having more than just two views. Most have at least four and some have nine or more views, resulting in a reduction in horizontal resolution as perceived by the viewing person to one-fourth, one-ninth, or less of the original resolution. At the same time, the vertical resolution of the image as perceived by the viewer remains unchanged, giving an unpleasant and noticeable imbalance in the horizontal and vertical resolutions of the displayed image.

BRIEF SUMMARY

In summary, in one aspect, a method of modifying a display including a plurality of pixels wherein each of the pixels is less than twice as tall as the pixel is wide includes modifying the display to create a plurality of modified pixels wherein each of the modified pixels is at least twice as tall as the modified pixel is wide, comprising at least one of a) masking of at least a portion of the display, b) optically shifting a perceived position of at least one row of sub-pixels of the display, and c) changing the addressing of sub-pixels of the display. In the case of a) and/or b) the method may further include changing the addressing of sub-pixels of the display. The physical nature of the sub-pixels of the plurality of pixels need not be changed. The actions of a), b) and/or c) enable the display of the modified pixels on the modified display via the sub-pixels without the need to physically change the sub-pixels.

In the case of masking of at least a portion of the display, the method may, for example, further include rotating the viewing orientation of the display by 90 degrees.

Each of the plurality of pixels may, for example, be formed from sub-pixels of different color, wherein like-colored sub-pixels are arranged in a vertical stripe pattern. The sub-pixels may, for example, include red sub-pixels, green sub-pixels and blue sub-pixels.

In a number of embodiments, the perceived position of at least one row of sub-pixels of the display is optically shifted by overlaying a prism strip over the at least one row. The perceived position of a plurality of rows of sub-pixels of the display may, for example, be optically shifted by overlaying a prism strip over more than one of the plurality of rows of sub-pixels. In a number of embodiments, a perceived position of a plurality of rows of sub-pixels of the display is optically shifted to cause a display including sub-pixels of different color, wherein like-colored sub-pixels are arranged in a vertical stripe pattern, to be perceived as display wherein like-colored sub-pixels are arranged in a generally diagonal pattern. Optical shifting devices such optical shifting prisms and/or optical shifting methodologies may, for example, be combined with other optical devices and/or methodologies in, for example, a single optical film. For example, optically shifting functionality may be combined with a view selector functionality (for example, provided by a lenticular array or a microlens array) in a single optical device or system (for example, in a single optical film).

Each of the modified pixels may include two or more sub-pixels that are vertically displaced from one another. Each of the pixels may, for example, include two or more sub-pixels that are vertically aligned.

In a number of embodiments, the modified display provides two or more views, each of views including one or more modified pixels. The method may further include providing a view selector in operative connection with the modified display that, for each of two or more viewing perspectives, makes one of the views visible. The view selector may, for example, include a lenticular array, parallax barriers or a microlens array.

In another aspect, an autostereoscopic display includes a plurality of modified pixels, two or more views, each of which includes one or more the plurality of modified pixels; and a view selector that, for each of two or more viewing perspectives, makes one of the views visible. Each of the modified pixels is at least twice as tall as the modified pixel is wide. The modified pixels are formed by modifying a display including a plurality of pixels wherein each of the plurality of pixels is less than twice as tall as the pixel is wide to create the plurality of modified pixels. Modifying the display includes at least one of a) masking of at least a portion of the display, b) optically shifting a perceived position of at least one row of sub-pixels of the display, and c) changing the addressing of sub-pixels of the display. The view selector may, for example, include a lenticular array, parallax barriers or a microlens array. In the case of a) and/or b) the method may further include changing the addressing of sub-pixels of the display.

As described above, in the case of masking of at least a portion of the display, the viewing orientation of the display may be rotated by 90 degrees.

Each of the plurality of pixels may, for example, be formed from sub-pixels of different color, wherein like-colored sub-pixels are arranged in a vertical stripe pattern. The sub-pixels may, for example, include red sub-pixels, green sub-pixels and blue sub-pixels.

In a number of embodiments, the perceived position of at least one row of sub-pixels of the display is optically shifted by overlaying a prism strip over the at least one row. The perceived position of a plurality of rows of sub-pixels of the display may, for example, be optically shifted by overlaying a prism strip over more than one of the plurality of rows of sub-pixels. In a number of embodiments, a perceived position of a plurality of rows of sub-pixels of the display is optically shifted to cause a display including sub-pixels of different color, wherein like-colored sub-pixels are arranged in a vertical stripe pattern, to be perceived as display wherein like-colored sub-pixels are arranged in a generally diagonal pattern. As described above, optical shifting devices such optical shifting prisms and/or optical shifting methodologies may, for example, be combined with other optical devices and/or methodologies in, for example, a single optical device or system. For example, optically shifting functionality may be combined with a view selector functionality in a single optical device or system (for example, in a single optical film).

As described above, each of the modified pixels may include two or more sub-pixels that are vertically displaced from one another. Each of the pixels may, for example, include two or more sub-pixels that are vertically aligned.

In a further aspect, a display includes a plurality of pixels wherein each of the pixels is less than twice as tall as the pixel is wide and masking to create a plurality of modified pixels wherein each of the modified pixels is at least twice as tall as the modified pixel is wide. Masking enables the display of the modified pixels on the display via the sub-pixels of the pixels (for example, via reprogramming of addressing) without the need to physically change the sub-pixels.

In still a further aspect, a display includes a plurality of pixels wherein each of the pixels is less than twice as tall as the pixel is wide, at least one optical mechanism to shift a perceived position of at least one row of sub-pixels of the display to create a plurality of modified pixels wherein each of the modified pixels is at least twice as tall as the modified pixel is wide. Optical enables the display of the modified pixels on the display via the sub-pixels of the pixels (for example, via reprogramming of addressing) without the need to physically change the sub-pixels.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the claimed invention will be pointed out in the appended claims.

DETAILED DESCRIPTION

Figure 1:
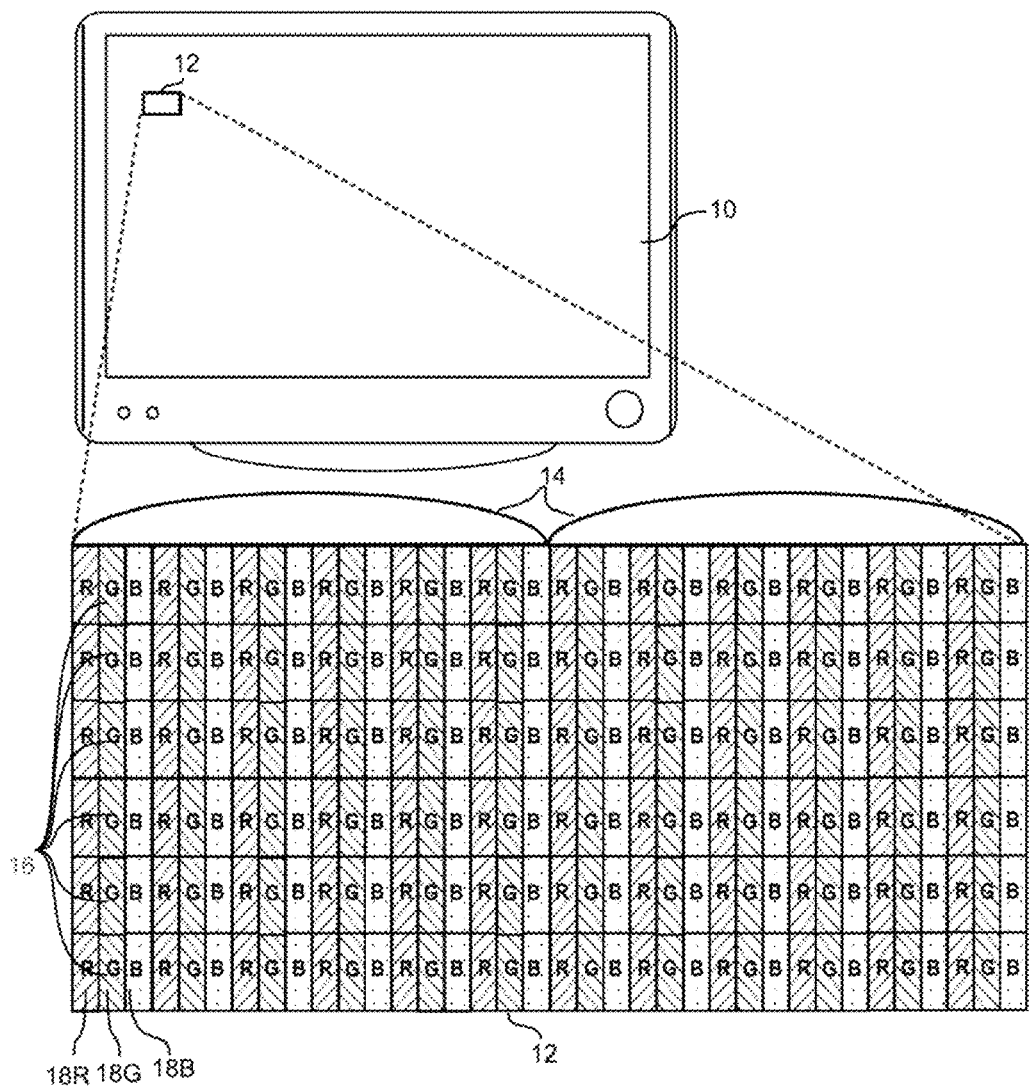
FIG. 1 shows a conventional autostereoscopic display, including sub-pixel arrangement in a conventional manner.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a pixel" includes a plurality of such pixels and equivalents thereof known to those skilled in the art, and so forth, and reference to "the pixel" is a reference to one or more such pixels and equivalents thereof known to those skilled in the art, and so forth.

In a number of embodiment hereof, a display uses tall, thin "vertical" pixels to display views of autostereoscopic images. The term "vertical pixels" as used herein refers to pixels that are at least twice as tall as they are wide. Vertical pixels hereof are often more than eight (8) times as tall as they are wide. As a result, the horizontal stretching of vertical pixels hereof in an autostereoscopic display is somewhat balanced, making horizontally stretched pixels that appear generally square-ish to a human viewer. In addition, the effective horizontal resolution of the views as perceived by a human viewer is significantly improved, allowing autostereoscopic displays to provide higher-quality images and/or to provide addition views. As used herein, the vertical direction refers to the direction generally aligned with the direction of the force of gravity (for example, as evidenced by a plumb line). The horizontal direction refers to a direction that is generally perpendicular to the vertical direction.

Conventional pixels in, for example, computer LCD displays include three (3) sub-pixels, each of which occupies the full height of the pixel and only about a third of the width of the pixel. In other words, each of these sub-pixels is about three (3) times as tall (vertical dimension) as it is wide (horizontal dimension). In a number of embodiments, hereof, the sub-pixels are rearranged, by substitution of the color mask that defines the color of each sub-pixel, such that sub-pixel logic of the display can regroup the sub-pixels. The sub-pixels are regrouped such that each pixel includes three (3) vertically displaced, vertically aligned, vertically adjacent sub-pixels. The result is that each pixel is approximately nine (9) times as tall as it is wide.

In autostereoscopic display with eight (8) views, and in which pixels are nine (9) times as tall as they are wide, the loss of resolution is divided nearly equally between the two dimensions. The horizontally-stretched pixels, as perceived through the view selector—such as a lenticular array or parallax barrier—is three (3) times as tall as a normal pixel of the display and is eight-thirds (2.67 times) as wide. The result is a much more pleasing autostereoscopic image for the human viewer.

Figure 4:
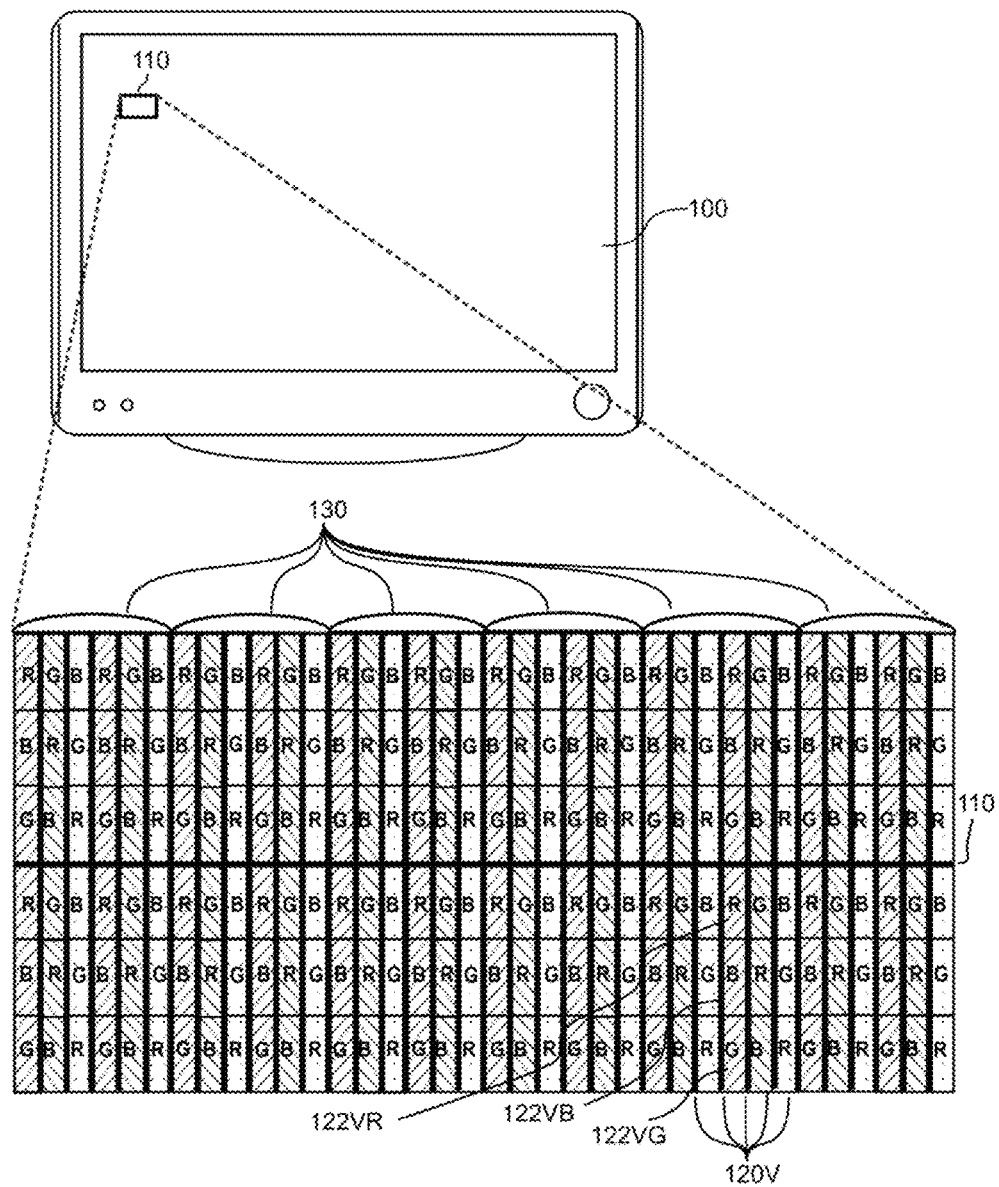
FIG. 4 shows the autostereoscopic display of FIG. 3 with the sub-pixels grouped into vertical pixels in accordance with the present invention.
Figure 5:
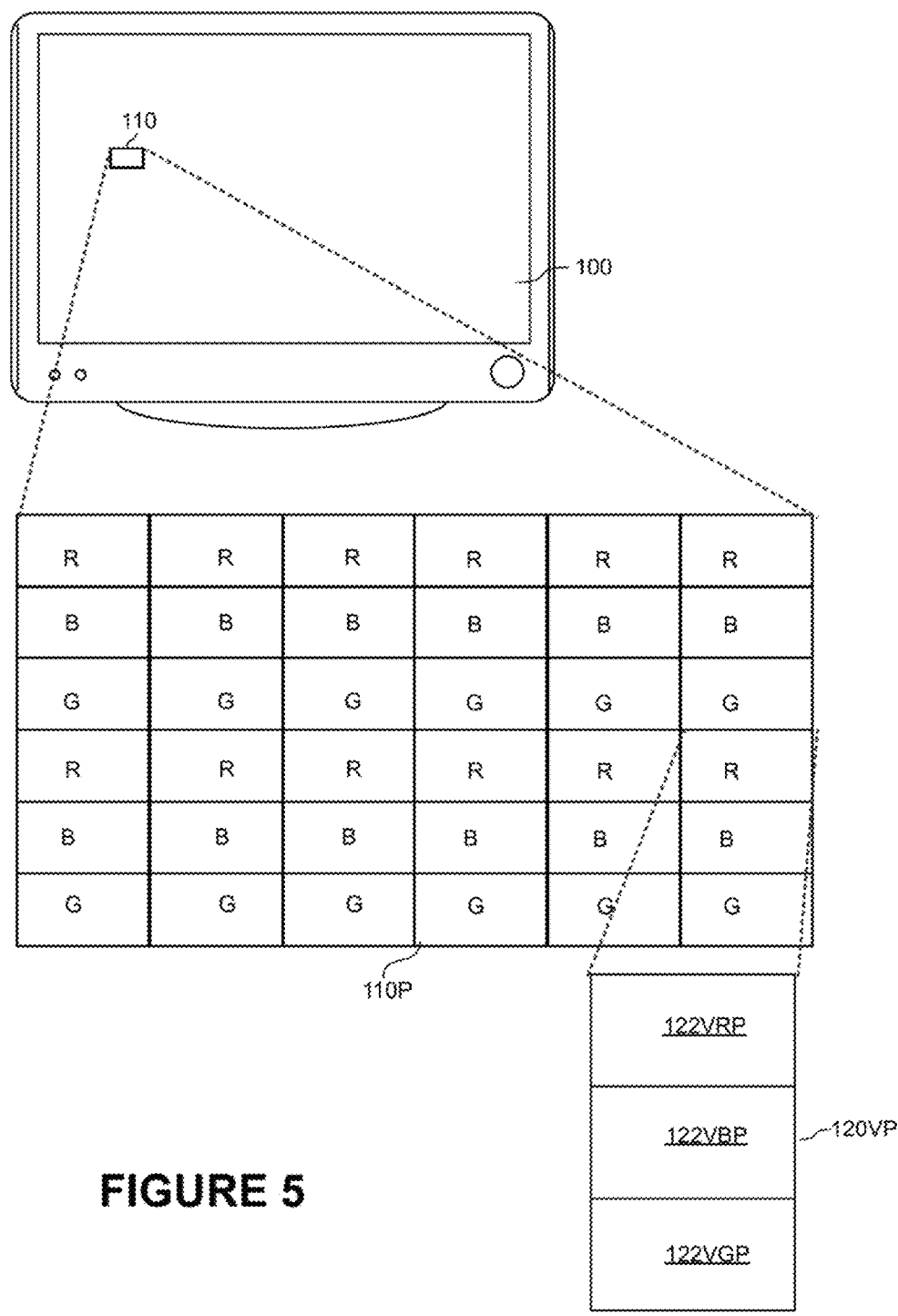
FIG. 5 shows the autostereoscopic display of FIGS. 3 and 4, showing the horizontally-stretched, vertical pixels as perceived by a human viewer.

Referring, for example, to FIG. 4, sub-pixels 122VR, 122VG, and 122VB of a display 100 are grouped into vertical pixels 120V that are at least twice as high as they are wide. Accordingly, visual distortion of a lenticular array 130 produces a perceived pixel array 110P (FIG. 5) that includes perceived pixels 120VP that more closely approximate a square than do perceived pixels—e.g., perceived pixel 16P (FIG. 1)—of conventional autostereoscopic displays.

It should be appreciated that, in addition to lenticular arrays such as lenticular array 130, other view selectors can be used. One example in use today is a parallax barrier. A microlens array, which is an array of lenslets (or small lenses), may also be used as a view selector. While lenticular arrays are columnar and operate as a view selector only in horizontal dimension, a microlens array including, for example, an array of circular lenslets may operate as a view selector even if a display is rotated 90 degrees. As used herein, a view selector is anything that selects a view in a display according to the angle from which the display is viewed.

In addition, "a view" is used herein to refer to a subset of an image presented to a viewer from a particular angle of view. As an example, it is helpful to consider a simple autostereoscopic display in which one eye of the human viewer can see every odd-numbered column of pixels and the other eye of the viewer can see every even-numbered column of pixels. The odd-numbered columns of pixels would collectively represent one view, and the even-numbered columns of pixels would collectively represent another view. It should be appreciated that most autostereoscopic displays have many more than just two views and that this very simple example is merely to illustrate how the term "view" is used herein.

As used here, a "pixel" is a picture element that is capable of displaying every color that the display of which the pixel is a part can display, and a "sub-pixel" is a picture element that is incapable of such without the cooperation of other sub-pixels of a given pixel. Most color display devices in use today include a single red sub-pixel, a single green sub-pixel, and a single blue sub-pixel positioned in close juxtaposition to provide the appearance of a single pixel that can display any color in the red-green-blue (RGB) color space. Creation of sub-pixels of various color components such as red, green, and blue—as well as addressing and control of individual sub-pixels to produce a single pixel of a specified color—are well known and are not described herein.

Figure 2:
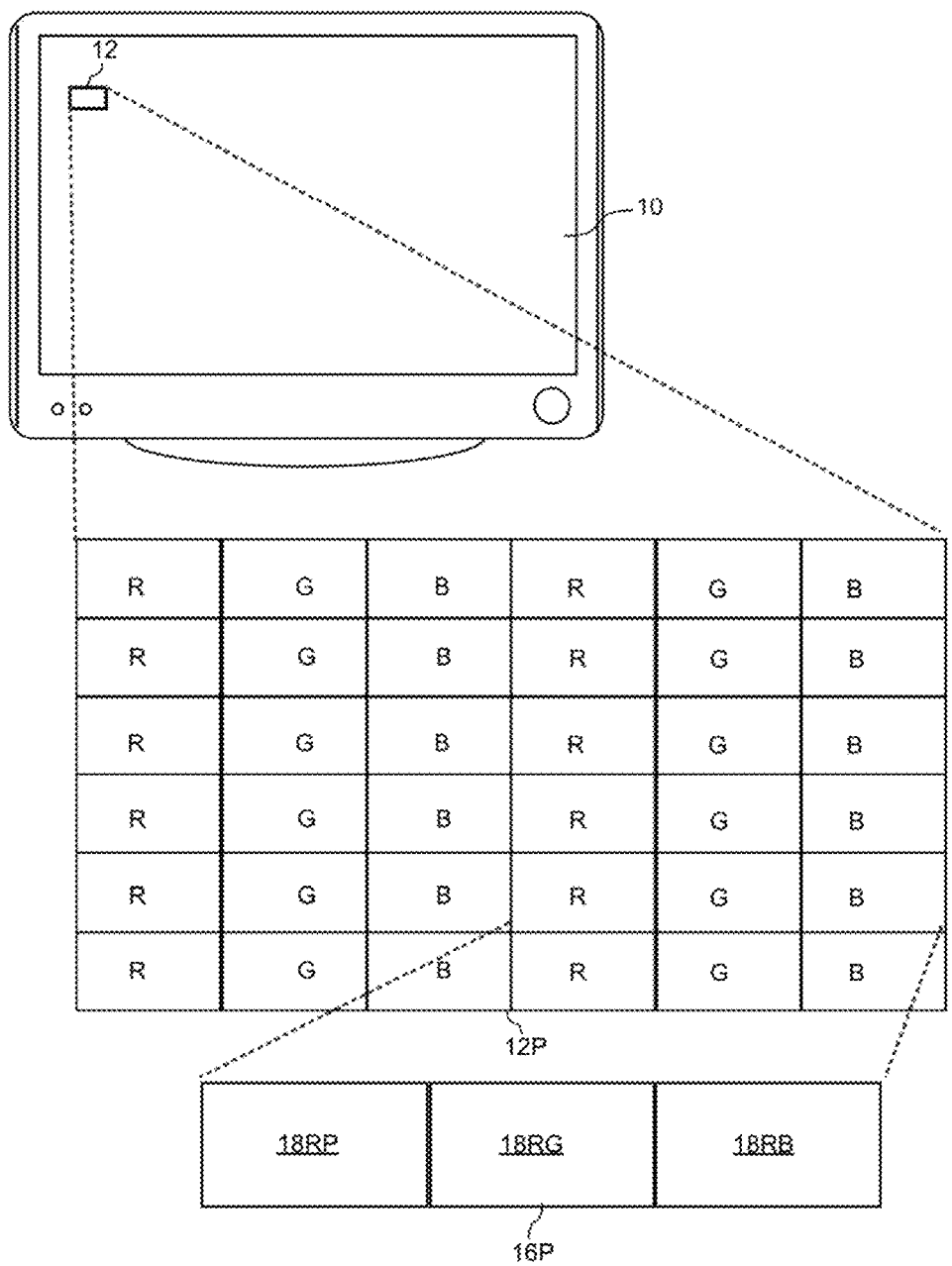
FIG. 2 shows the conventional autostereoscopic display of FIG. 1 with horizontally stretched pixels as perceived by a human viewer.

To facilitate appreciation and understanding of embodiments hereof, sub-pixel arrangements in conventional autostereoscopic displays are shown in FIGS. 1 and 2. The design and function of the autostereoscopic display of FIGS. 1 and 2 are known and only described herein to facilitate appreciation and understanding of various embodiments hereof.

A portion 12 of display 10 (of, for example, a device such as a monitor or a television) is shown enlarged and in vertical alignment with a view selector, which is a lenticular array 14 that is shown in a cross-sectional view in this example. Portion 12 includes individual pixels 16 that are generally of the sub-pixel composition of most digital displays available today. In particular, each of pixels 16 has a generally square shape that includes relatively thin, relatively tall, rectangular red, green, and blue sub-pixels side-by-side in the generally square area of the pixel—e.g., red sub-pixel 18R, green sub-pixel 18G, and blue sub-pixel 18B. The sub-pixel pattern of FIG. 1 is sometimes referred to as an RGB stripe pattern.

Lenticular array 14 presents one of six pixels to each eye of a viewing person. Thus, lenticular array 14 provides six (6) different views that are viewable from various points of view. Lenticular array 14 distorts the appearance of a presented pixel of a view to fill essentially the entirety of the space of all six (6) underlying pixels. Such is illustrated as perceived pixel 12P (FIG. 2), which includes perceived sub-pixels 18RP, 18GP, and 18BP. Relative to the size of an ordinary pixel 16 (FIG. 1), a single perceived pixel 16P (FIG. 2) of perceived portion 12P is elongated 600% in the horizontal dimension and not at all in the vertical direction.

Figure 6:
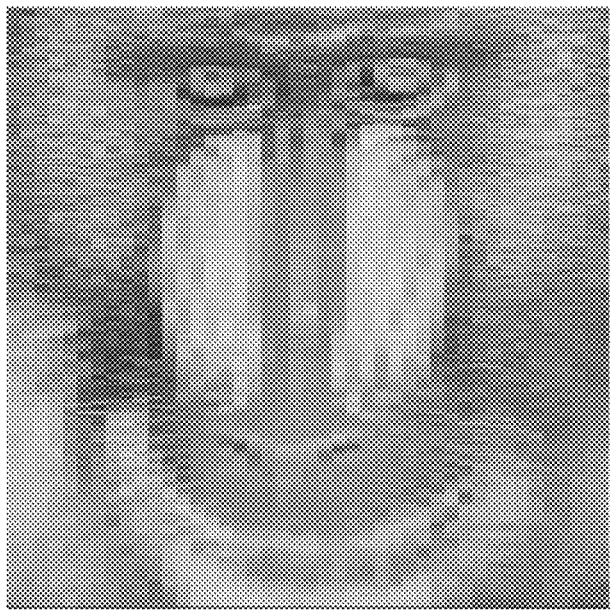
FIG. 6 shows an image in which pixels are horizontally stretched by the conventional autostereoscopic display of FIGS. 1 and 2.
Figure 7:
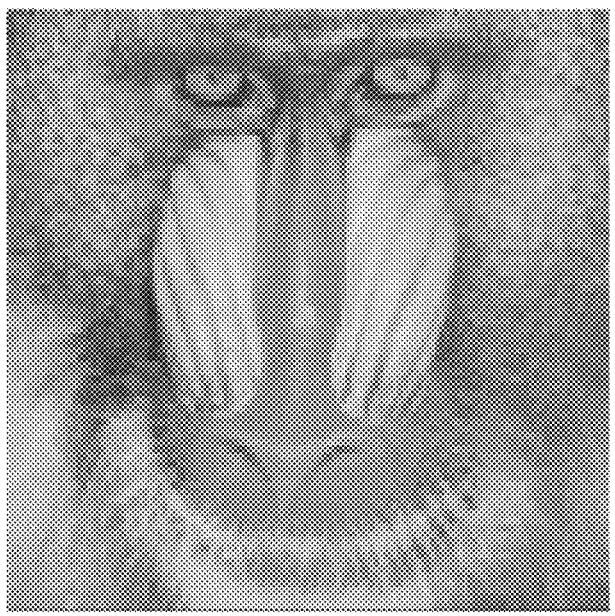
FIG. 7 shows an image in which pixels are horizontally stretched by the autostereoscopic display of FIGS. 3-5.
Figure 8:
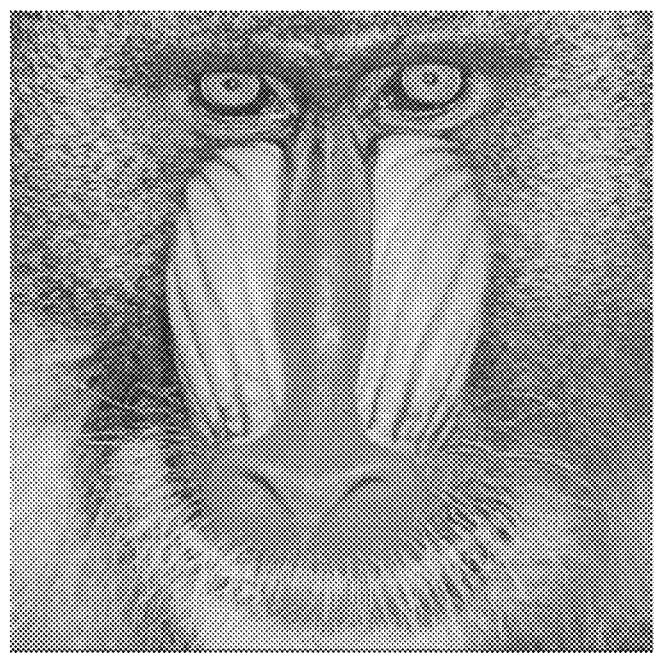
FIG. 8 shows the image of FIGS. 6-7 prior to distortion for comparison to the distorted images of FIGS. 6-7.

The result of pixels elongated entirely and solely in the horizontal direction is severe distortion of the image as perceived and such is shown in the image of FIG. 6. In contrast, use of vertical pixels 120V (FIG. 4) in the manner described herein results in an image as shown in FIG. 7. The original, full-resolution image is shown in FIG. 8 for comparison. It should be observed that, while both images have resolution reduced by the same amount, the image of FIG. 7 clearly shows the ribbed shape of the blue portions of the mandrill's face while such details are completely lost in the image of FIG. 6. Similarly, the mandrill's left eye (to the viewer's right) appears to be severely malformed in FIG. 6 but appears to be properly shaped and formed in FIG. 7. Numerous other undesirable artifacts are severely pronounced in FIG. 6 and significantly mitigated in FIG. 7.

Figure 3:
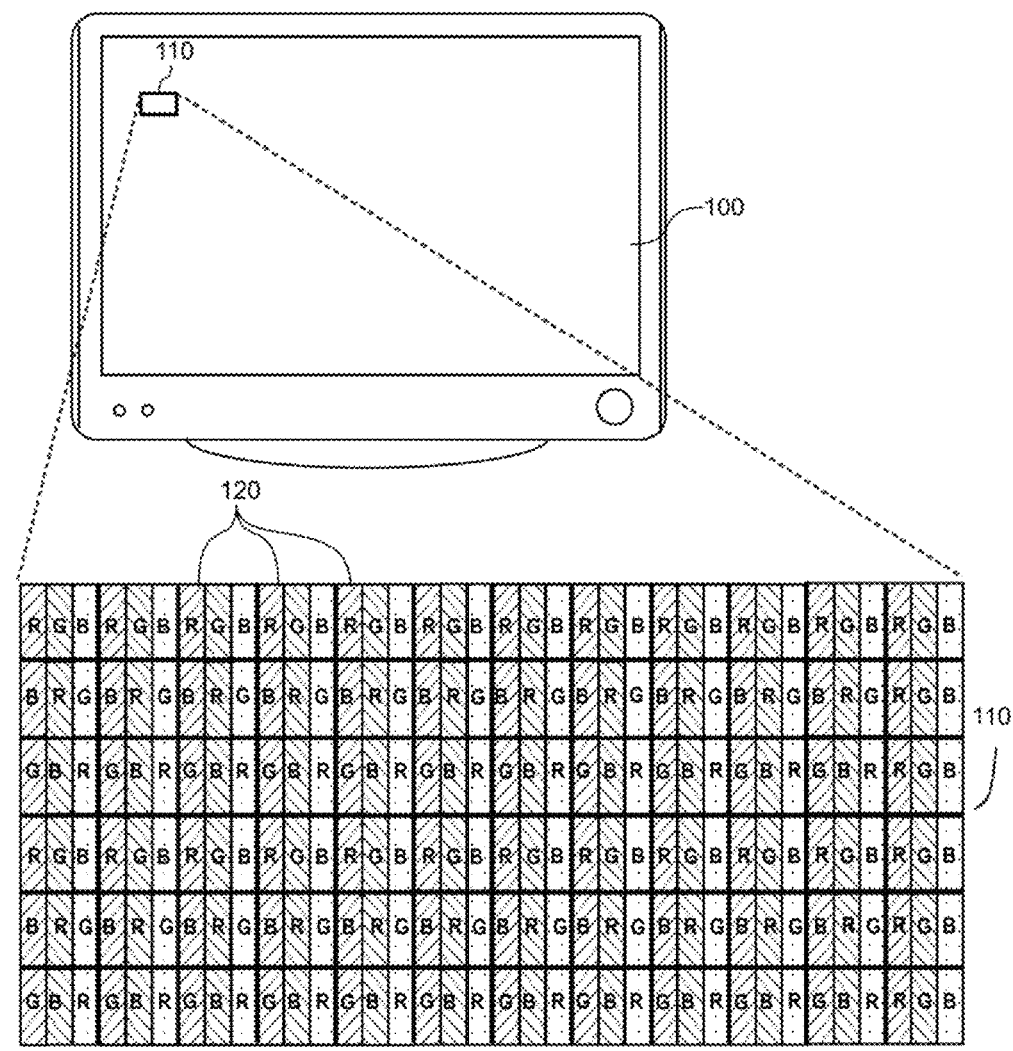
FIG. 3 shows an autostereoscopic display in which sub-pixels are rearranged in accordance with the present invention.

Vertical pixels 120V are also "vertical" in the sense that the relatively tall, thin, rectangular sub-pixels of a given pixel are displaced from one another vertically. In particular, a given vertical pixel 120V includes a red sub-pixel from one scanline of display 100, a green sub-pixel from a different scanline of display 100, and a blue sub-pixel from yet another scanline of display 100. While display 100 can have entire scanlines of a given color—e.g., each scanline is entirely red, green, or blue sub-pixels—in a number of embodiments, the sub-pixels are staggered as shown in FIG. 3 such that display 100 can also use generally square, horizontal pixels 120 for viewing of images at full resolution without lenticular array 130 (FIG. 4). In general, pixels that are generally square are desirable in high-resolution, two-dimensional displays. As used here, a pixel is "generally square" if the height of the pixel is no more than 1.5 times the width of the pixel and the width of the pixel is no more than 1.5 times the height of the pixel.

As shown in FIG. 4, a red sub-pixel 122VR, a blue sub-pixel 122VB, and a green sub-pixel 122VG are vertically displaced from one another, vertically aligned, and collectively represent a single vertical pixel 120V. The result is that vertical pixels 120V are thrice the height and one-third the width of a typical pixel, e.g., pixels 16 (FIG. 1). In addition, vertical pixels 120V are approximately nine (9) times as tall as they are wide. Generally, good results are achieved when vertical pixels are at least twice as tall as they are wide. While pixels of such dimensions produce undesirable artifacts when used in a conventional, non-autostereoscopic display, such tall, thin pixels provide desirable results in autostereoscopic displays as described herein.

The particular amount by which the height of pixels exceeds their length depends on the particular configuration of lenticular array 130. Generally, best results are achieved when the vertical pixels as perceived through lenticular array 130 most closely approximate a square.

Figure 9:
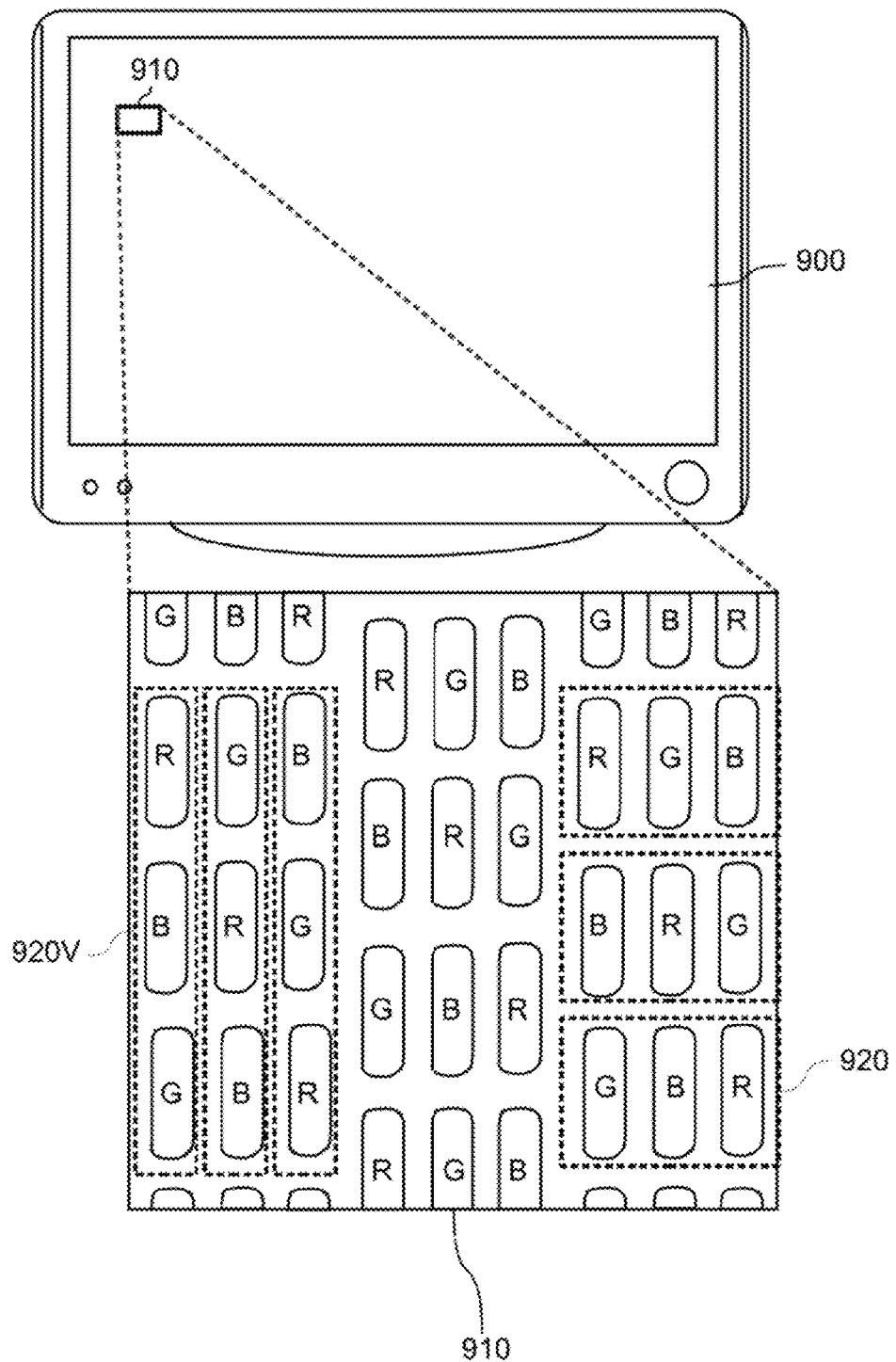
FIG. 9 shows an autostereoscopic display in which sub-pixels of an LCD television have been rearranged in accordance with the present invention.
Figure 10:
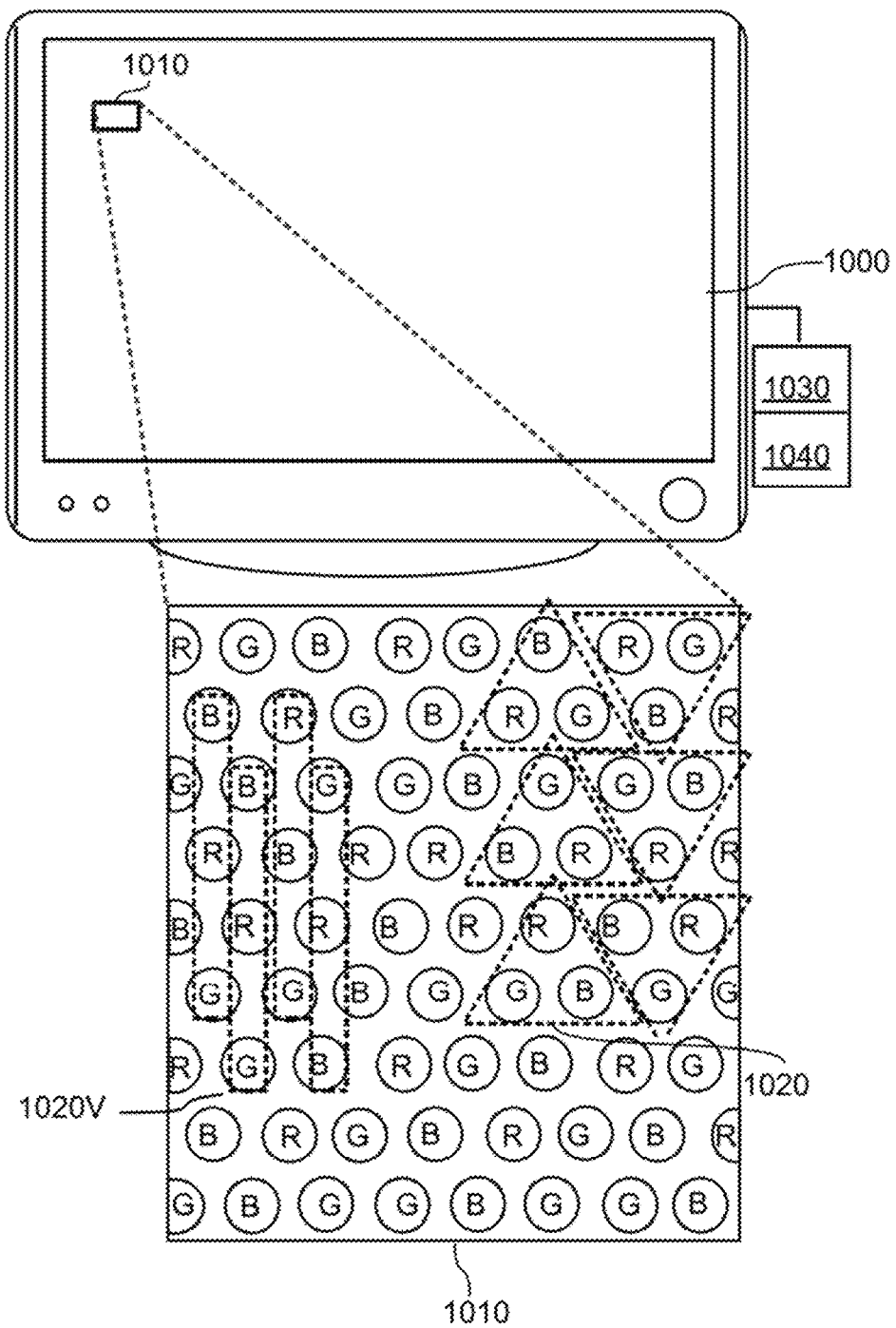
FIG. 10 shows an autostereoscopic display in which sub-pixels of a personal computer CRT display have been rearranged in accordance with the present invention.

FIGS. 9 and 10 show similarly vertical pixels using sub-pixels of LCD Television displays and computer CRT displays, respectively. The sub-pixel arrangement of display portion 910 (FIG. 9) enables vertical pixels 920V and generally square pixels 920. Vertical pixels 920V are 8.12 times as tall as they are wide. Similarly, the sub-pixel arrangement of display portion 1010 (FIG. 10) enables vertical pixels 1020V and generally square pixels 1020. While pixels 1020 are really three (3) circular sub-pixels arranged in a triangular shape, pixels 1020 are "generally square" as defined above. Vertical pixels 1020V are 8.85 times as tall as they are wide.

As shown in FIGS. 4, 9, and 10, regrouping sub-pixels in conventional spatial relationships to form vertical pixels typically results in pixels that are at least eight (8) times as tall as they are wide.

Because of the arrangement of sub-pixels 122VR, 122VB, and 122VG in display 100 (FIG. 4) to form vertical pixels 120V, lenticular array 130 has three (3) times as many cylindrical lenses as does lenticular array 14 (FIG. 1) for the same number of pixels. In other words, each cylindrical lens of lenticular array 130 (FIG. 4) is one-third the width of cylindrical lenses of lenticular array 14 (FIG. 1) as a result of the reduced width (one-third) of vertical pixels 120V (FIG. 4). The result is perceived portion 110P (FIG. 5) that includes perceived vertical pixels such as perceived vertical pixel 120VP. Perceived vertical pixel 120VP is 600% the size of pixels 120 (FIG. 3), just as perceived pixel 16P (FIG. 2) is 600% the size of pixels 16 (FIG. 1). However, unlike perceived pixel 16P in which the increase in size—and corresponding loss of resolution—is all in one dimension, perceived vertical pixel 120VP (FIG. 5) shares the increase in size and loss of resolution between both dimensions. Perceived vertical pixel 120VP is twice the width and thrice the height of pixels 120 (FIG. 3). Thus, perceived vertical pixel 120VP (FIG. 5) significantly more closely approximates a square pixel than does perceived pixel 16P (FIG. 2).

As noted above, reduction of resolution by a factor of six (6) in the horizontal dimension and not at all in the vertical dimension results in images like that shown in FIG. 6, and reduction of resolution by a factor of two (2) in the horizontal dimension and by a factor of three (3) in the vertical dimension results in images like that shown in FIG. 7. The result is dramatic in the perceived image quality of autostereoscopic images perceived by a viewing person.

In a number of embodiments hereof, sub-pixel patterns suitable to form vertical pixels as described above, are formed during the manufacture of a display, for example, by substitution of a suitable color mask that defines the color of each sub-pixel. Alternatively, suitable sub-pixel patterns may, for example, be formed via appropriate deposition of organic light emitting devices (OLEDs) upon a substrate (as known in the OLED arts) during manufacture of the display.

In other embodiments, a display manufactured for display of, for example, high-resolution, two-dimensional images may be altered after manufacture thereof (and without substantial change to the existing hardware thereof, including the physical elements forming the sub-pixels of the display) to provide vertical pixels as described herein by addressing the sub-pixels in groupings to form the vertical pixels. Referring, for example, to display portion 1010 of FIG. 10, generally square pixels 1020 are formed in what is sometimes referred to as a "delta" pixel pattern. Rearranging or regrouping sup-pixels of display portion 1010 to form vertical pixels 1020V may be accomplished, for example, via software stored in a memory system 1030 in communicative connection with a processor 1040. No changes are required to the existing hardware of display 1000.

Figure 11A:
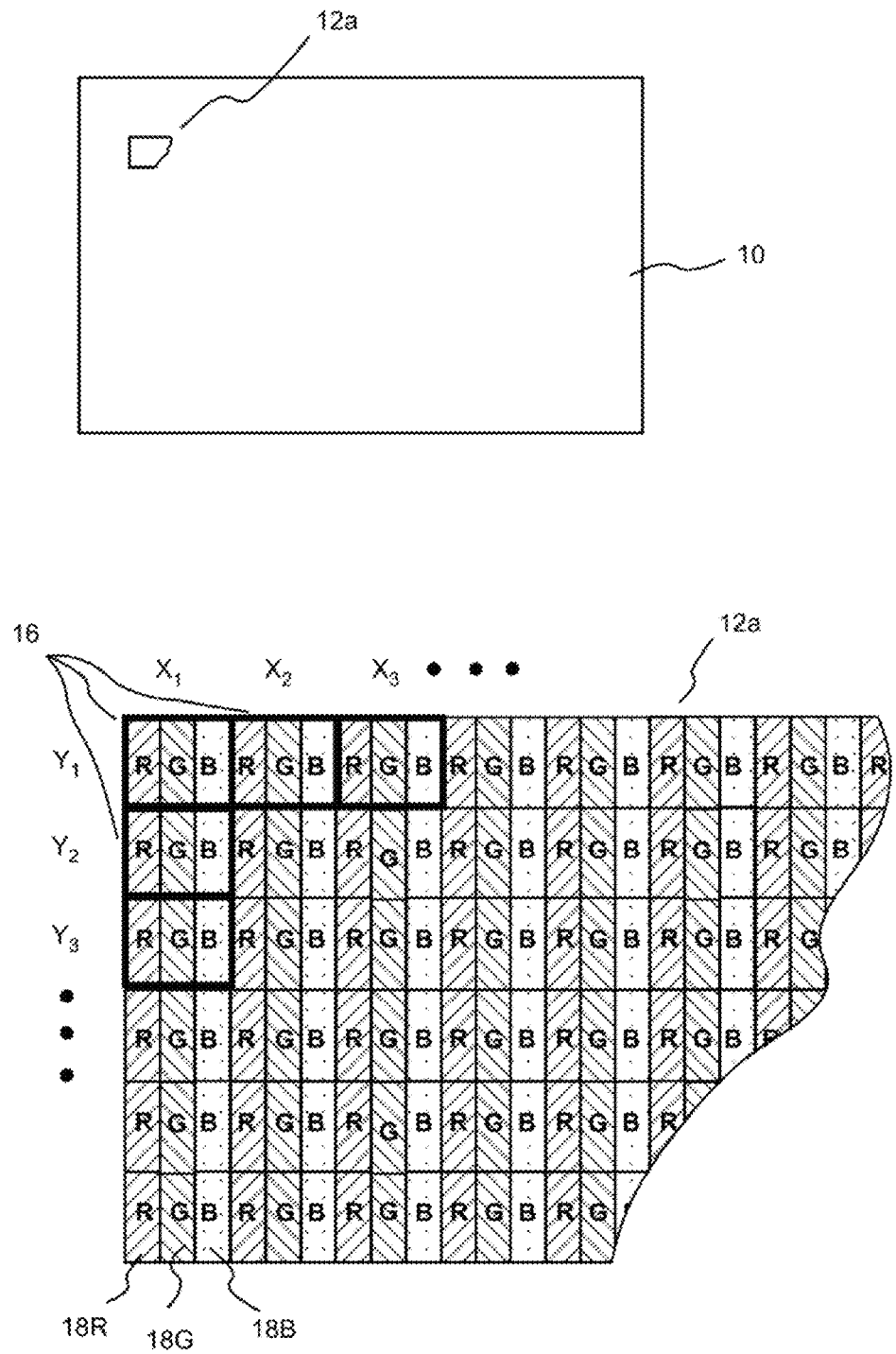
FIG. 11A shows a conventional display and an enlarged portion or section thereof including a sub-pixel arrangement in a conventional RGB stripe pattern.
Figure 11B:
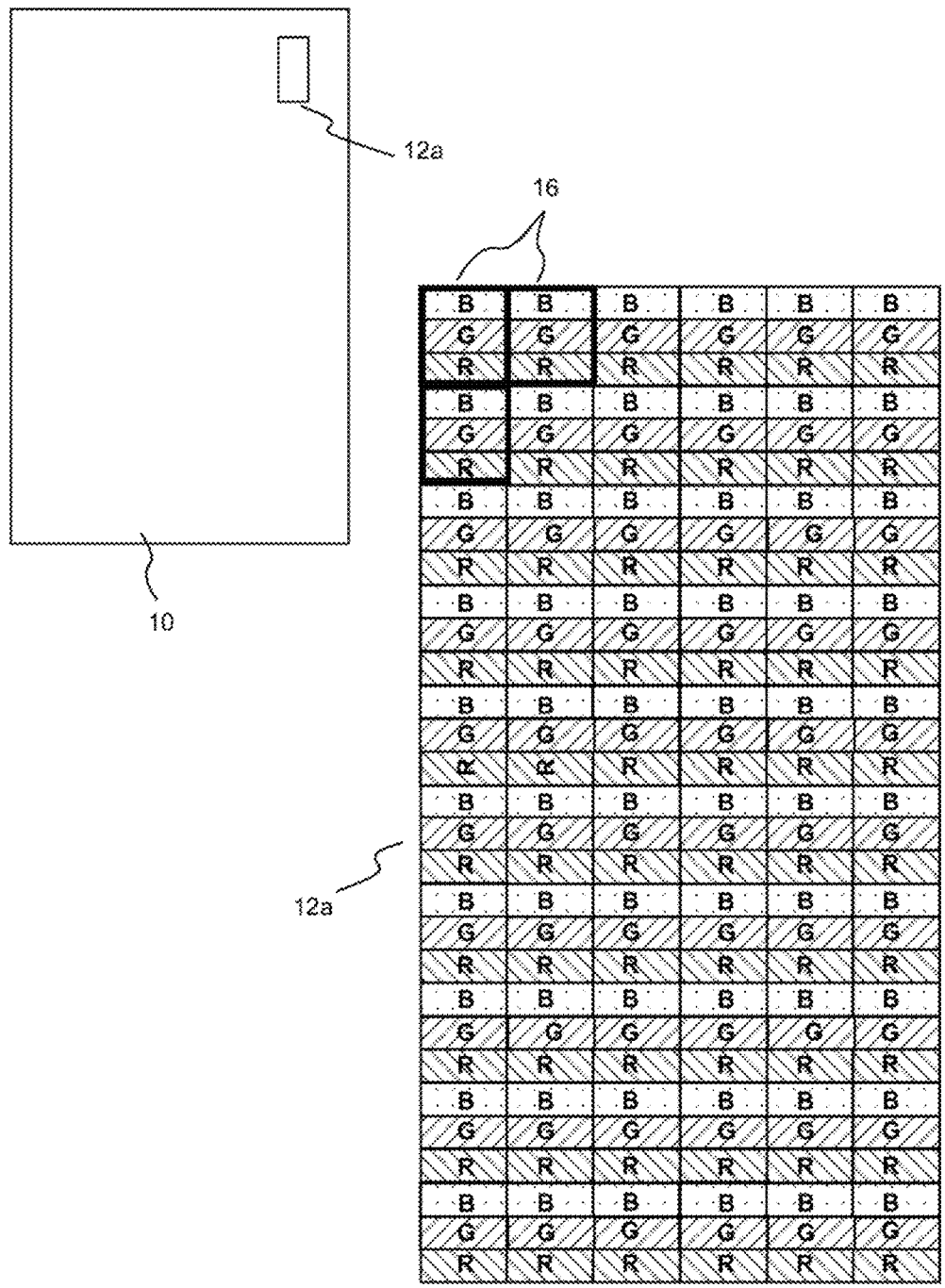
FIG. 11B shows rotation of the orientation of the display of FIG. 11A by 90 degrees.

In other embodiments, masking may be used to alter the aspect ratio of sub-pixels of a display to create modified pixels which are vertical pixels as described herein. FIG. 11A, for example illustrates an enlarged portion 12a of display 10 (see FIG. 1). As described in connection with FIG. 1, portion 12a of display includes individual, generally square pixels 16 formed from relatively tall, rectangular red, green, and blue sub-pixels side-by-side in the generally square area of pixel 16—e.g., red sub-pixel 18R, green sub-pixel 18G, and blue sub-pixel 18B. The RGB stripe pattern illustrated in FIG. 11B is the most common sub-pixel pattern used in currently available digital displays (and, particularly, for large displays such as those used in televisions). Pixels 16 may, example, be addressed with horizontal and vertical coordinates (or columns/rows) such as $X_iY_j$, $X_iY_{j+1}$ etc. and define a display resolution such as 1920× 1080 (horizontal×vertical) typical of, for example, a 1080p high-definition television (HDTV). For simplicity, the upper left pixel 16 in FIG. 11a is designated $X_1Y_1$.

Rotating display 10 by 90 degrees as illustrated in FIG. 11B, results in the RGB stripes extending horizontally rather than vertically. Using a common 1080p display as an example, in the orientation of FIG. 11B, display 10 has the 1080-pixel-resolution side running horizontally and the 1920-pixel-resolution side running vertically. Thus its original 16:9 aspect ratio, with 16 being the original horizontal dimension or width, is converted to a 9:16 aspect ratio, with 9 being the horizontal dimension or width.

Figure 11C:
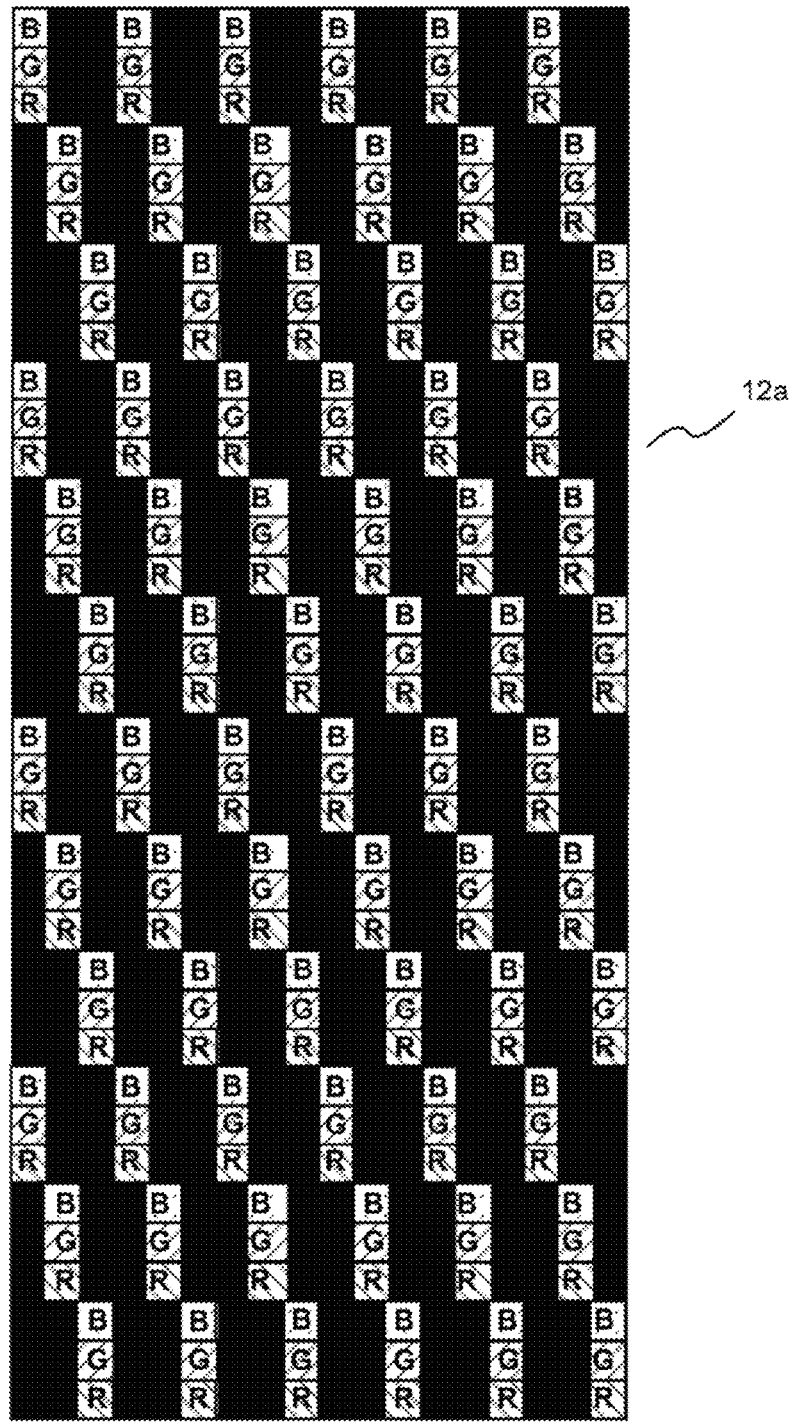
FIG. 11C shows masking of the rotated display of FIG. 11B to created modified, vertical pixels hereof.

In a number of embodiments hereof, to convert display 10 to a pattern of vertical pixels, one masks off two-thirds of the horizontally extending area of each original pixel 16 as illustrated in FIG. 11C (in which the masked areas are represented by black areas). Between vertically adjacent rows of original pixels 16 in the orientation of FIG. 11C (which correspond to original columns $X_1$, $X_2$, $X_3$ etc. in the orientation of FIG. 11A), the masking area is offset by ⅓ of the width of original pixels 16. Masking may, for example, be effected via printers including suitable fine print heads as known in the printing arts. Reversible or controllable masking may be effected using, for example, an LCD-based masking screen.

Figure 11D:
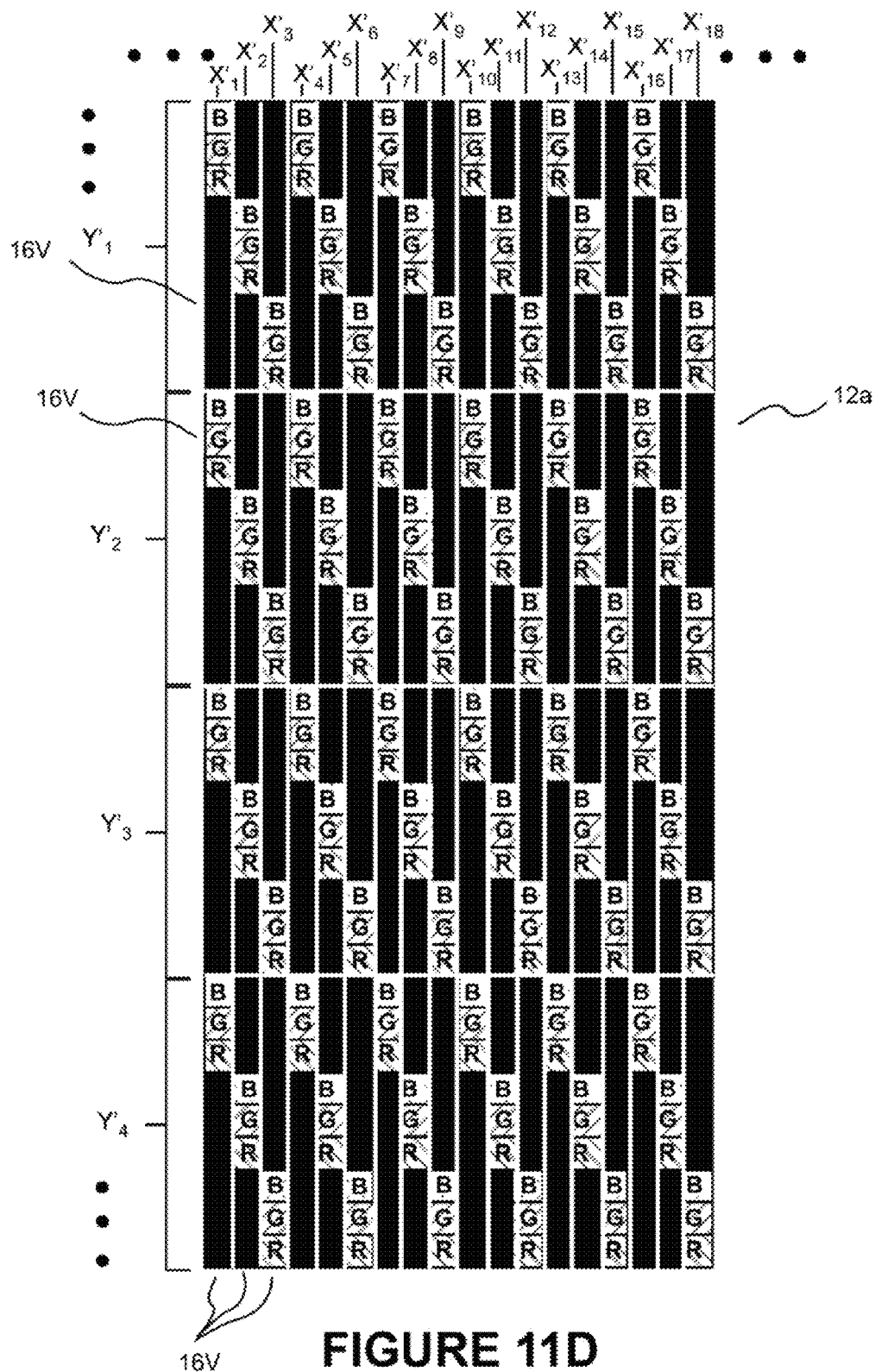
FIG. 11D illustrates the vertical pixels of FIG. 11C and the addressing of rows and columns of the vertical pixels.

As illustrated in FIG. 11D, rows $Y'_1$, $Y'_2$, $Y'_3$ etc., of modified pixels 16V are defined to include groups of three vertically offset pixels 16V to reprogram the originally generally square pixels 16 into modified, vertical pixels 16V. The masking does not alter the physical nature of the sub-pixels of the display, but provides a methodology to display such sub-pixels as vertical sub-pixels.

Figure 12:
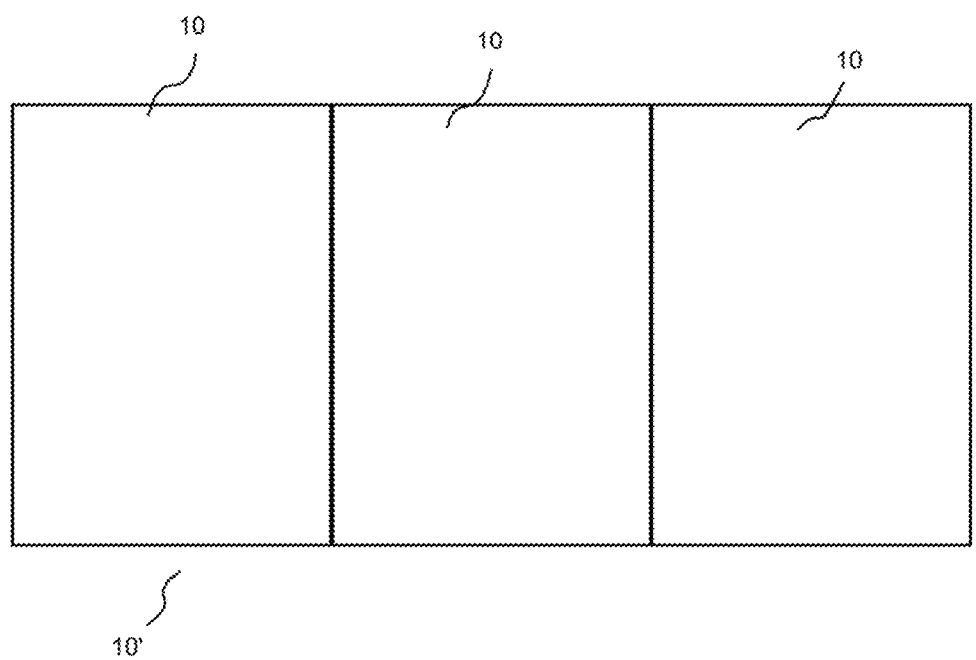
FIG. 12 illustrates a plurality of the displays of FIG. 11A, after modification thereof to created vertical pixels as illustrated in FIG. 11D, in a tiled arrangement.

When grouped under a lenticular lens that is aligned parallel to what are now the vertical columns $X'_1$, $X'_2$, $X'_2$ etc. in the masked display of FIG. 11D, display 10 now can show three times the horizontal number of columns, or views, as compared to unmodified or unmasked display 10 as illustrated, for example, in FIG. 11A. The increase in horizontal resolution comes at the expense of exhibiting three times less vertical resolution and loss of approximately two thirds of the light emitted by display 10 with any given overall display brightness. For the case that display 10 originally had a resolution of 1920×1080, after rotation by 90 degrees and masking as described above, the resolution becomes 3240×640 (horizontal×vertical). In that regard, after rotation, the resolution with original pixels 16 is 1080×1920. Upon masking and reprogramming to create modified, vertical pixels 16V, the horizontal resolution is tripled (1080×3=3240), while the vertical resolution is ⅓ of the vertical resolution before masking and reprogramming (1920×⅓=640). After masking and reprogramming (to readdress pixels), multiple displays 10 may be tiled in any fashion as, for example, illustrated in FIG. 12 to provide a tiled display 10' of a desired area.

Figure 13A:
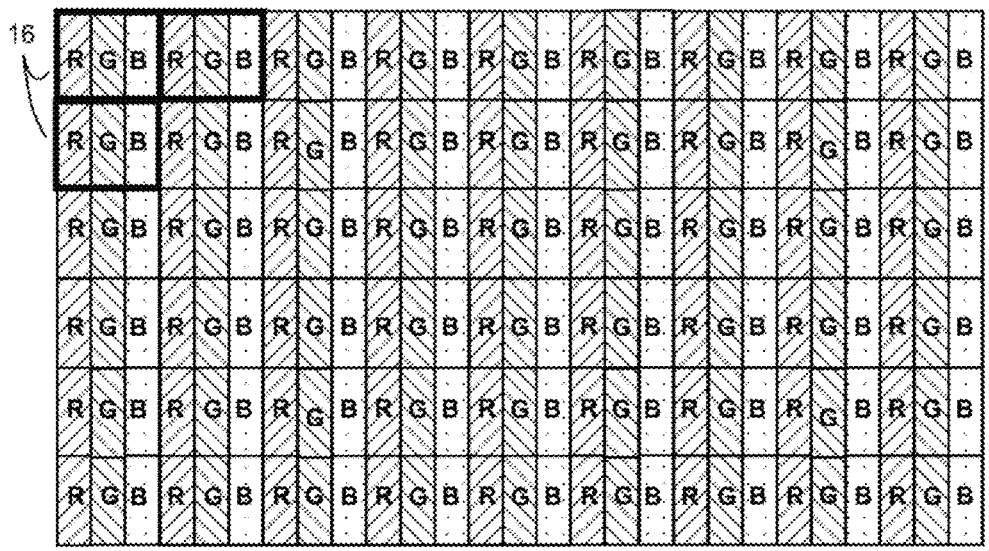
FIG. 13A illustrates another portion of a display including an RGB stripe sub-pixel pattern.
Figure 13B:
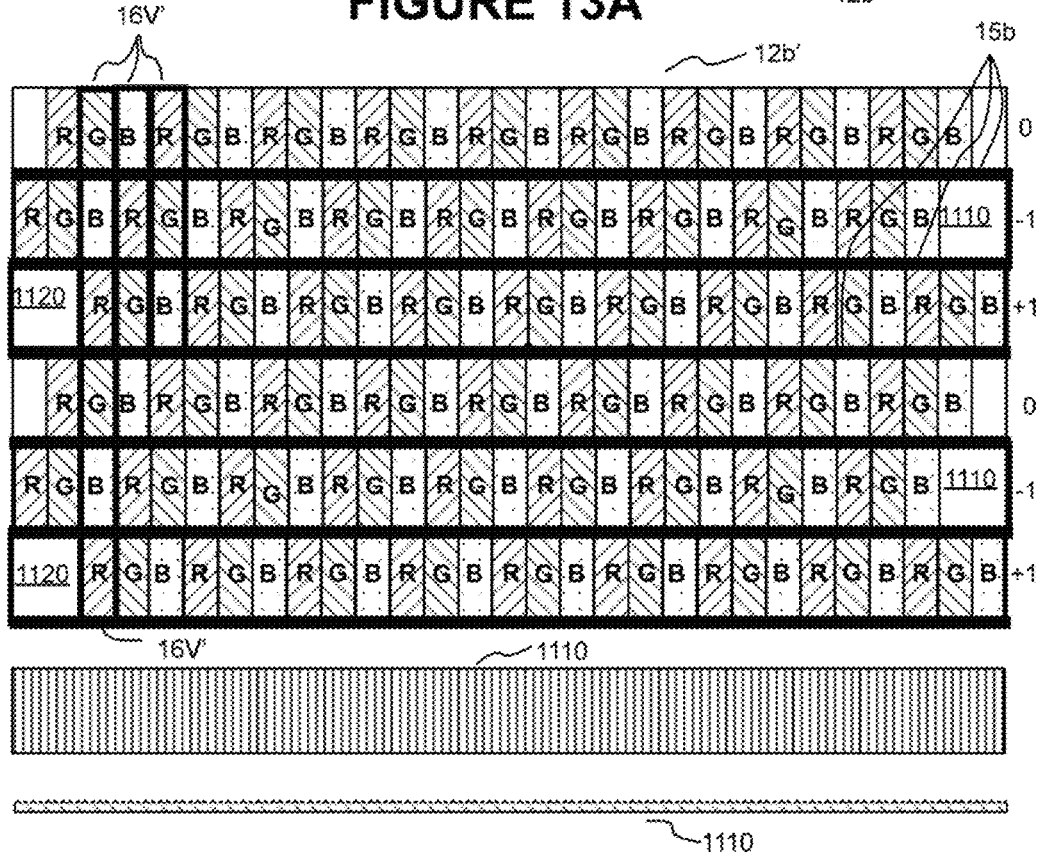
FIG. 13B illustrates optical shifting of the positions of sub-pixels in determined rows of the display portion of FIG. 13A to create modified, vertical pixels hereof.

FIGS. 13A and 13B illustrate another methodology for altering a display such as display 10 to exhibit vertical pixels as described herein. FIG. 13A illustrates another enlarged portion 12b of display 10. As illustrated in FIG. 13B, an overlay of horizontally extending (in the orientation of FIG. 13B) prisms/prism strips 1100a and 1100b (for example, Fresnel prism strips) may be used to shift light from two out of every three rows of sub-pixels in series, for example, either to the left or to the right. Such shifting of sub-pixels results in a generally diagonal perceived alignment of sub-pixels of the same color in perceived portion 12b' of FIG. 13B rather than the original vertical or stripe alignment of sub-pixels of the same color illustrated in portion 12b of FIG. 13A. The sub-pixels in such a diagonal sub-pixel arrangement are readily arranged/regrouped (via, for example, software programming) in vertical pixels 16V' as illustrated in FIG. 13B. The physical nature of the sub-pixels of the display are not altered. Optically shifting the position of some sub-pixels and addressing programming, however, provides a methodology to display such sub-pixels as vertical sub-pixels.

In FIG. 13B, the area of each prism strips 1110 and 1120 is outlined by a thickened black line. In the illustrated embodiment, a first row of sub-pixels is not shifted and no prism strip is required. This is represented by a "0" shift designation to the right of the first row. A second row of pixels has prism strip 1110 overlaid thereon to shift the perceived position of the sub-pixels of the second row to the left by the width of 1 sub-pixel, which is represented by a −1 shift designation to the right of the second row. A third row of pixels has prism strip 1120 overlaid thereon to shift the perceived position of the sub-pixels of the second row to the right by the width of 1 sub-pixel, which is represented by a +1 shift designation to the right of the third row. This pattern of shifting is repeated for each group of three rows in display 10. A top plan view of prism strip 1110 and a side cross-sectional view of prism strip 1110 are also illustrated in FIG. 13B. The representations of sub-pixels, pixels 16V, and prism strips 1110 and 1120 are not drawn to scale in FIG. 13B In the example of a 56-inch diagonal (46-inch wide) quad full HD ("QFHD" or 3840×2160) resolution display, prisms of a prism strip may, for example, require 1 degree deflection, which corresponds to an index of 1.5 and a vertex angle of 2 degrees. Alternating rows in sets of three as described above may, for example, be achieved using prism strips formed upon an optical film. The optical film is overlaid upon display 10. The horizontal dimension of each prism may, for example, be optimized for overall film thickness and image accuracy, while ensuring that no vertical pixel is split between adjacent prisms. Prism strips 1110 and 1120 should be precisely vertically aligned with the corresponding or underlying sub-pixel row. The order and/or degree of shifting may, for example, be varied to optimize the accuracy of the lens array. Moreover, a microlens array in a single optical layer may be used to both optically shift the perceived position of pixels (as, for example, illustrated in FIG. 13B) and as a view selector as described above.

To assist in preventing "cross-talk" between vertically adjacent rows when viewing a display from a relatively large vertically displaced angle (relative to the display) in the case that prisms are used to shift the position of sub-pixels as described above, masking may, for example, be used to prevent viewing of a sub-pixel or portion of a sub-pixel that is not vertically overlaid by or aligned with a particular prism or prism strip. Such masking is represented by horizontal lines 15b in FIG. 13B. Masking 15b allows the display to be viewed, for example, from an extreme upward or downward angle without viewing a pixel or a portion of a pixel from through a prism that is not directly overlaid by that prism.

Figure 14A:
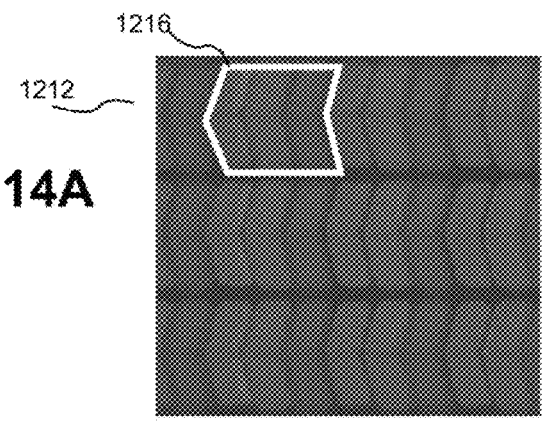
FIG. 14A illustrates a portion of a display including a chevron pixel pattern in which sub-pixels of the same color are generally vertically aligned.
Figure 14B:
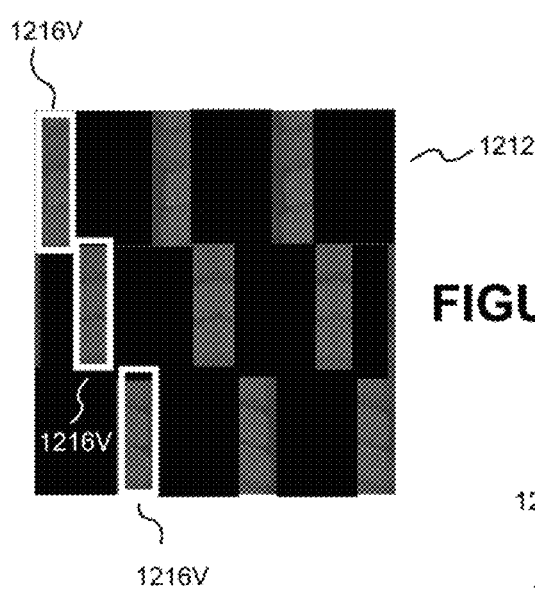
FIG. 14B illustrates rotation of the display portion of FIG. 14A and masking thereof to create modified, vertical pixels hereof.

The techniques for modifying pre-manufactured or standard displays described above (and/or combinations thereof) may, for example, be used in connection with many different types of sub-pixel patterns other than RGB-stripe patterns. For example, FIG. 14A illustrates a display portion 1212 including a sub-pixel pattern sometimes referred to as a chevron pattern. In FIG. 14B, the display (and thus display portion 1212) has been rotated 90 degrees and a mask has been applied to create vertical pixels 1216V in a manner similar to that described above in connection with FIGS. 11B through 11D. In the embodiment of FIG. 14B, a relatively simple masking pattern has been used to create generally rectangular vertical pixels. However, a more complicated mask may be used which, for example, follows the angled perimeters of the chevron sub-pixels.

Figure 14C:
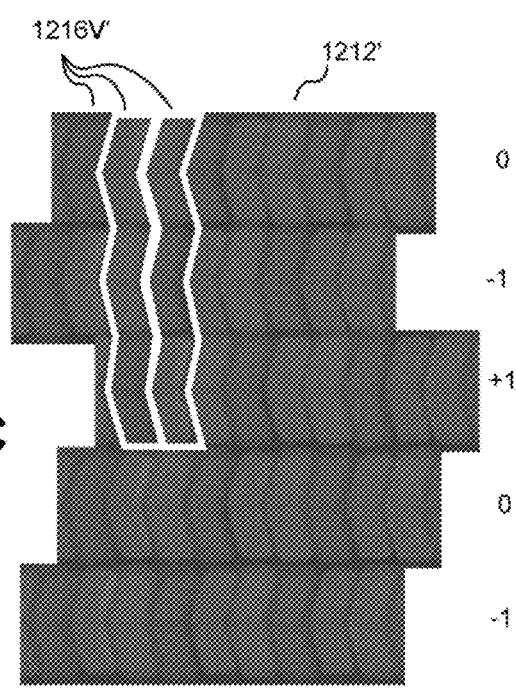
FIG. 14C illustrates optical shifting of the positions of sub-pixels in determined rows of the display portion of FIG. 14A to create modified, vertical pixels hereof.

In FIG. 14C, rows of sub-pixels of display portion 1212 have been shifted in a manner similar to that described in connection with FIG. 13B. In that regard, an overlay of prism strips (not shown) such as Fresnel prism strips may be used to shift light from two out of every three rows of sub-pixels in series, for example, either to the left or to the right. Once again, shifting of sub-pixels results in a generally diagonal alignment of sub-pixels of the same color in perceived display portion 1212' of FIG. 14C rather than the original, generally vertical alignment of sub-pixels of the same color illustrated in portion 1212 of FIG. 14A. Sub-pixels of different color are generally vertically aligned in a repeating pattern. The sub-pixels in such a diagonal sub-pixel arrangement are thus readily arranged/regrouped in vertical pixels 1216V' as illustrated in FIG. 14C.

Figure 15A:
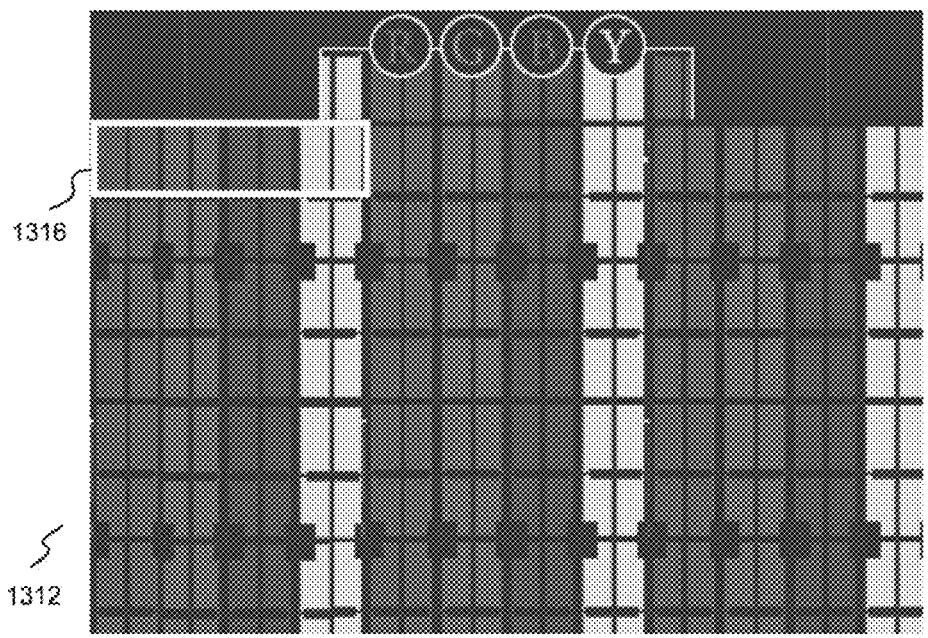
FIG. 15A illustrates a portion of a display including an RGBY pixel pattern in which sub-pixels of the same color are generally vertically aligned.
Figure 15B:
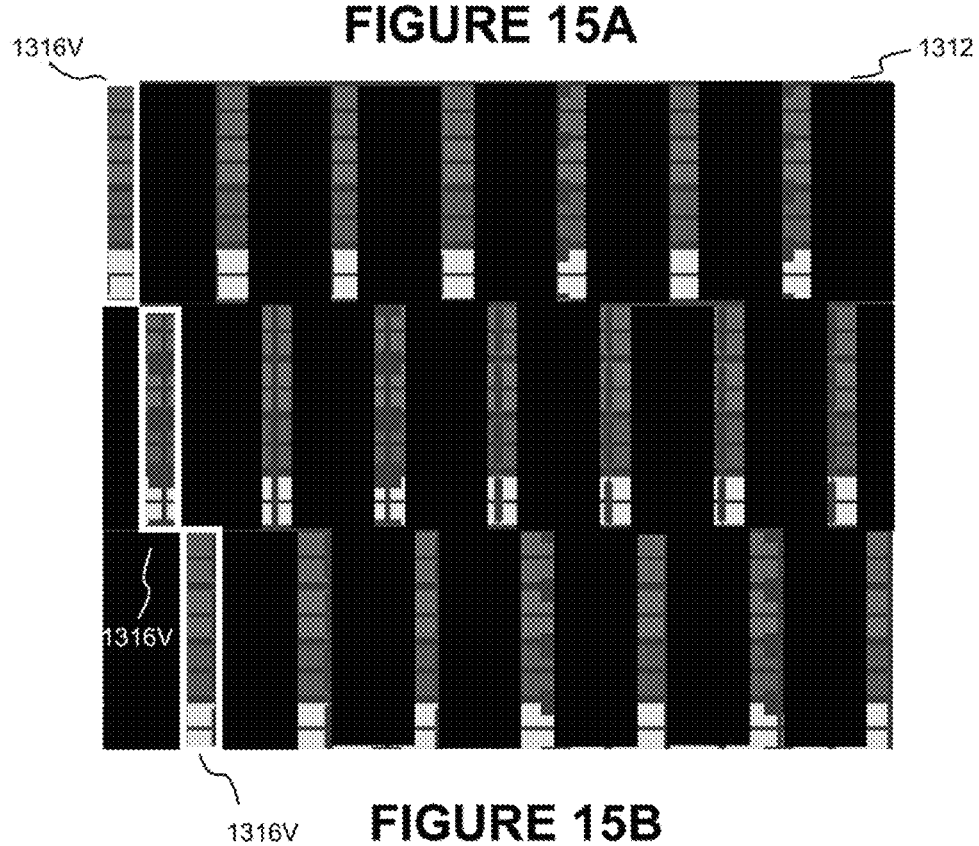
FIG. 15B illustrates rotation of the display portion of FIG. 15A and masking thereof to create modified, vertical pixels hereof.

FIG. 15A illustrates a display portion 1312 including a sub-pixel pattern having vertical columns or "stripes" of red, green, blue, and yellow (RGBY) sub-pixels. In FIG. 15B, the display (and thus display portion 1312) has been rotated 90 degrees and a mask has been applied to create vertical pixels 1316V in a manner similar to that described above in connection with FIGS. 11B through 11D.

Figure 15C:
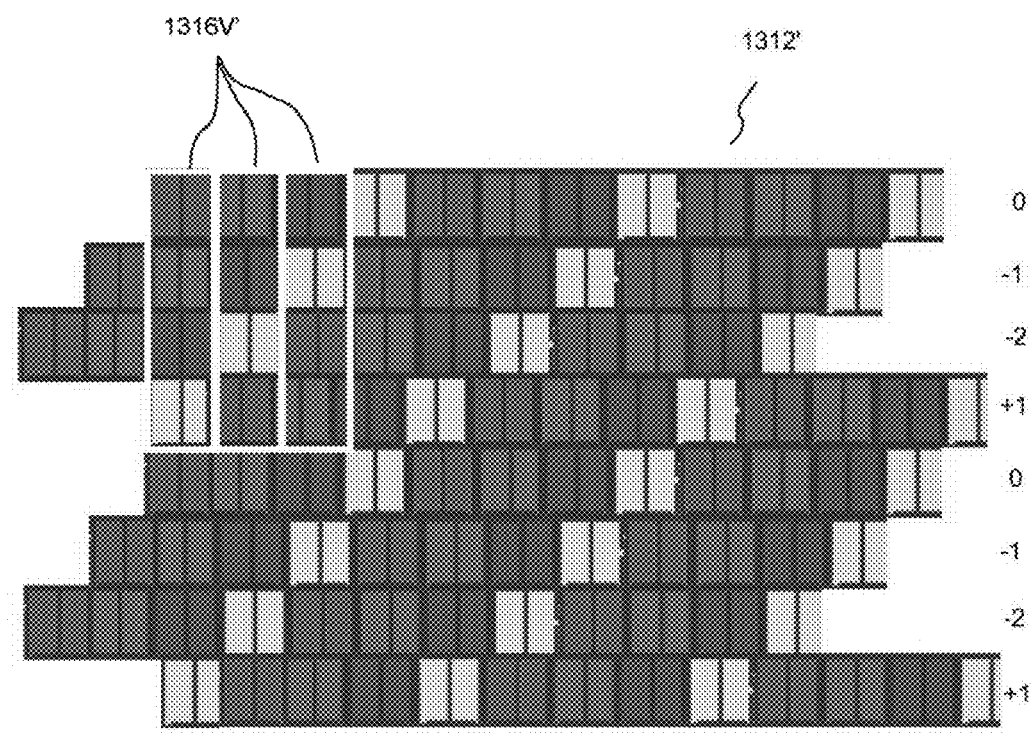
FIG. 15C illustrates optical shifting of the positions of sub-pixels in determined rows of the display portion of FIG. 15A to create modified, vertical pixels hereof.

In FIG. 15C, rows of sub-pixels of display portion 1212 have been shifted in a manner similar to that described in connection with FIG. 13B. As described above, an overlay of prism strips (not shown in FIG. 15C) such as Fresnel prism strips may be used to shift light from three out of every four rows of sub-pixels in series. As described above, shifting of rows of sub-pixels results in a generally diagonal alignment (with a single sup-pixel width offset) of sub-pixels of the same color in perceived portion 1312' of FIG. 15C rather than the original, generally vertical alignment of sub-pixels of the same color illustrated in portion 1312 of FIG. 15A. The sub-pixels in such a diagonal sub-pixel arrangement are readily arranged/regrouped in vertical pixels 1316V' as illustrated in FIG. 15C.

Figure 16A:
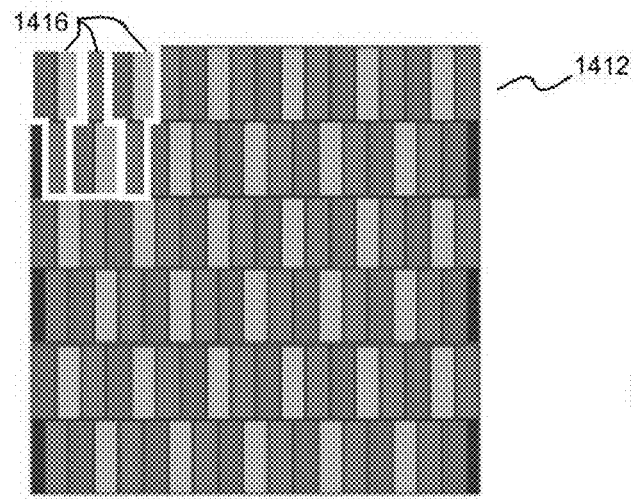
FIG. 16A illustrates a portion of display in which sub-pixels are arranged into pixels in a "delta" pattern.
Figure 16B:
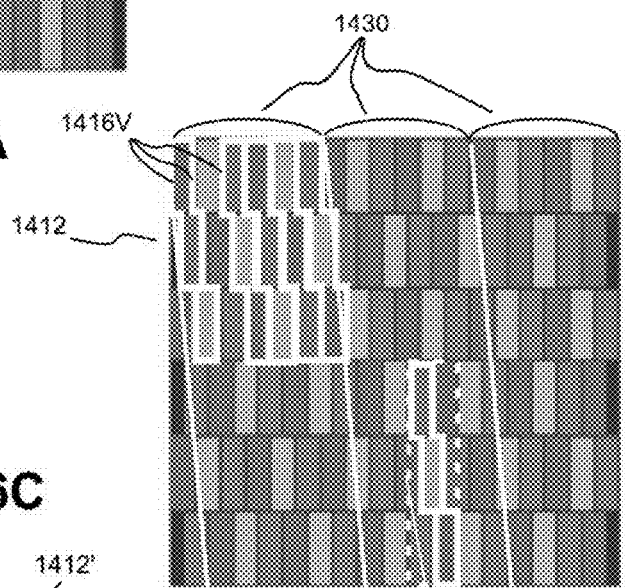
FIG. 16B illustrates the sub-pixels of 16A rearranged into vertical pixels hereof.

FIG. 16A illustrates a display portion 1412 including a "delta" sub-pixel pattern including red, green, and blue sub-pixels. The sub-pixels of display portion 1412 are approximately 3 times as tall as they are wide (in the orientation of FIG. 16A) and are offset (between adjacent rows) by approximately ½ the width of a sub-pixel to form delta-shaped pixels 1416 as illustrated in FIG. 16A. In FIG. 16B, the grouping of the sub-pixels has been reprogrammed to form vertical pixels 1416V.

In the case of vertical pixels 1416V the red, green, and blue sub-pixels of each vertical pixel 1416V are not precisely vertically aligned but are offset by approximately ½ the width of a sub-pixel. Vertical pixels 1416V may, for example, be described as having height to width ratio of approximately 4.5 as represented by the dashed rectangle in FIG. 16B. Using, for example, vertically oriented or columnar lenticular array, a pixel or a portion of a pixel 1416V may be presented in a particular view in which such a pixel 1416V should not appear (that is, "cross-talk" may occur). Some cross-talk may be acceptable in certain embodiments. However, cross-talk is minimized in a number of embodiments hereof. Cross-talk may, for example, be minimized in the case of FIG. 16B using view selector including an angled lenticular array 1430 which has an angle similar to or the same as the angle of offset of the vertically displaced sub-pixels of vertical pixels 1416V. Likewise, an offset microlens array may be used as a view selector. Moreover, masking may be used to reduce or eliminated cross-talk.

Figure 16C:
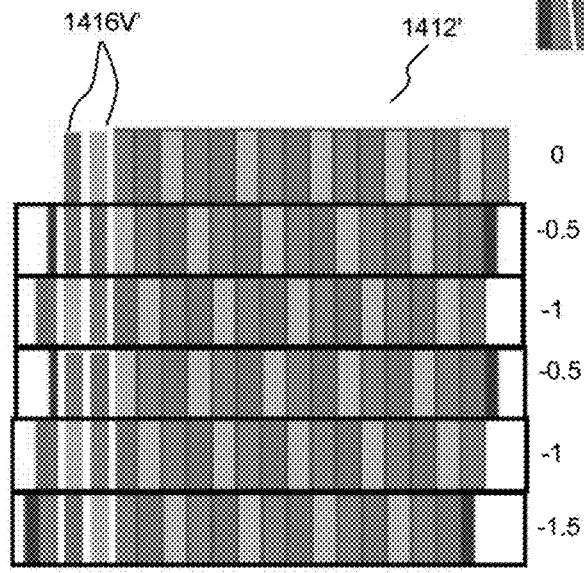
FIG. 16C illustrates optical shifting of the positions of sub-pixels in determined rows of the display portion of FIG. 16A to create modified, vertical pixels hereof.

FIG. 16C illustrates the optical shifting of rows of pixels of display portion 1412 to provide a perceived display portion 1412' in which the sub-pixels are vertically aligned and are grouped to form modified, vertical pixels 1416V. Further, like other embodiment described above, display portion 1412 may also be rotated 90 degrees and masking may be used to create vertical pixels.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of modifying a display including a plurality of pixels wherein each of the pixels is less than twice as tall as the pixel is wide, each pixel comprising a plurality of sub-pixels, the method comprising:

modifying the display to create a plurality of modified vertical pixels comprising a plurality of sub-pixels, wherein each of the modified vertical pixels is at least twice as tall as the modified vertical pixel is wide and wherein the modifying comprises modifying a perceived position of the plurality of sub-pixels within a pixel;

the modifying comprising masking of at least a portion of the display wherein the masking of at least a portion of the display comprises rotating the viewing orientation of the display by 90 degrees, masking at least a portion of each of the plurality of pixels, and offsetting the masked at least a portion of each of the plurality of pixels by a predetermined value.

2. The method of claim 1 further comprising changing the addressing of sub-pixels of the display after the masking at least a portion of the display.

3. The method of claim 1 wherein each of the plurality of modified vertical pixels is formed from sub-pixels of different colors, wherein like-colored sub-pixels are arranged in a vertical stripe pattern.

4. The method of claim 1 wherein each of the plurality of modified vertical pixels is formed from sub-pixels of different colors, wherein like-colored sub-pixels are arranged in a vertical stripe pattern.

5. The method of claim 4 wherein the sub-pixels comprise red sub-pixels, green sub-pixels and blue sub-pixels.

6. The method of claim 1 further comprising optically shifting a perceived position of at least one row of sub-pixels of the display and wherein the perceived position of at least one row of sub-pixels of the display is optically shifted by overlaying a prism strip over the at least one row and wherein the perceived position of the at least one row of sub-pixels comprises a sub-pixel arrangement wherein sub-pixels comprising a same sub-pixel type are arranged in a diagonal grouping.

7. The method of claim 1 further comprising optically shifting a perceived position of at least one row of sub-pixels of the display and wherein the perceived position of a plurality of rows of sub-pixels of the display is optically shifted by overlaying a prism strip over more than one of the plurality of rows of sub-pixels.

8. The method of claim 1 further comprising optically shifting a perceived position of at least one row of sub-pixels of the display and wherein optically shifting a perceived position of the at least one row of sub-pixels of the display is combined with another optical function in a single system.

9. The display of claim 8 wherein optically shifting a perceived position of the at least one row of sub-pixels of the display is combined with view selection in a single optical film.

10. The method of claim 1 further comprising optically shifting a perceived position of at least one row of sub-pixels of the display and wherein a perceived position of a plurality of rows of sub-pixels of the display is optically shifted to cause a display comprising sub-pixels of different colors, wherein like-colored sub-pixels are arranged in a vertical stripe pattern, to be perceived as display wherein like-colored sub-pixels are arranged in a generally diagonal pattern.

11. The method of claim 1 wherein each of the modified vertical pixels includes two or more sub-pixels that are vertically aligned.

12. The method of claim 1 wherein the modified display provides two or more views, each of views comprising one or more modified vertical pixels.

13. The method of claim 12 further comprising providing a view selector in operative connection with the modified display that, for each of two or more viewing perspectives, makes one of the views visible.

14. The method of claim 13 wherein the view selector comprises a lenticular array, parallax barriers or a microlens array.

15. The method of claim 1 wherein each of the modified vertical pixels comprises two or more sub-pixels that are vertically displaced from one another.

16. The method of claim 1, wherein the sub-pixels comprise sub-pixels of different colors, and wherein the modifying a position of the plurality of sub-pixels comprises modifying the position of the sub-pixels such that the sub-pixels appear on the display to be rows of like colored sub-pixels.

17. An autostereoscopic display comprising:
a plurality of modified vertical pixels, wherein each modified vertical pixel comprises a plurality of sub-pixels;
two or more views, each of which includes one or more the plurality of modified vertical pixels; and
a view selector that, for each of two or more viewing perspectives, makes one of the views visible;
wherein each of the modified vertical pixels is at least twice as tall as the modified vertical pixel is wide, and wherein the modified vertical pixels are formed by modifying a display including a plurality of pixels wherein each of the plurality of pixels is less than twice as tall as the pixel is wide to create the plurality of modified vertical pixels and wherein the modifying comprises modifying a position of the plurality of sub-pixels within a pixel;
the modifying the display comprising masking of at least a portion of the display wherein the masking of at least a portion of the display comprises rotating the viewing orientation of the display by 90 degrees, masking at least a portion of each of the plurality of pixels, and offsetting the masked at least a portion of each of the plurality of pixels by a predetermined value.

18. The display of claim 17 wherein the addressing of the sub-pixels of the display is changed after the masking of at least a portion of the display.

19. The display of claim 17 wherein each of the plurality of modified vertical pixels is formed from sub-pixels of different colors, and wherein like-colored sub-pixels are arranged in a vertical stripe pattern.

20. The display of claim 17 wherein each of the plurality of modified vertical pixels is formed from sub-pixels of different colors, wherein like-colored sub-pixels are arranged in a vertical stripe pattern.

21. The display of claim 20 wherein the sub-pixels comprise red sub-pixels, green sub-pixels and blue sub-pixels.

22. The display of claim 17 further comprising optically shifting a perceived position of at least one row of sub-pixels of the display and wherein the perceived position of at least one row of sub-pixels of the display is optically shifted by overlaying a prism strip over the at least one row.

23. The display of claim 17 further comprising optically shifting a perceived position of at least one row of sub-pixels of the display and wherein the perceived position of a plurality of rows of sub-pixels of the display is optically shifted by overlaying a prism strip over more than one of the plurality of rows of sub-pixels.

24. The display of claim 22 wherein a system for optically shifting a perceived position of the at least one row of sub-pixels of the display also performs another optical function.

25. The display of claim 22 wherein an optical film optically shifts a perceived position of the at least one row of sub-pixels of the display and also function as the view selector.

26. The display of claim 17 further comprising optically shifting a perceived position of at least one row of sub-pixels of the display and wherein a perceived position of a plurality of rows of sub-pixels of the display is optically shifted to cause a display comprising sub-pixels of different colors, wherein like-colored sub-pixels are arranged in a vertical stripe pattern, to be perceived as display wherein like-colored sub-pixels are arranged in a generally diagonal pattern.

27. The display of claim 17 wherein each of the pixels includes two or more sub-pixels that are vertically aligned.

28. The display of claim 17 wherein the view selector comprises a lenticular array, parallax barriers or a microlens array.

29. The display of claim 17 wherein each of the modified vertical pixels comprises two or more sub-pixels that are vertically displaced from one another.

30. The display of claim 17, wherein the sub-pixels comprise sub-pixels of different colors, and wherein the modifying a position of the plurality of sub-pixels comprises modifying the position of the sub-pixels such that the sub-pixels appear on the display to be rows of like colored sub-pixels.

31. A display comprising:
- a plurality of pixels wherein each of the pixels is less than twice as tall as the pixel is wide; and
- at least one mechanism that modifies the display to create a plurality of modified vertical pixels by masking at least a portion of the display, wherein each of the modified vertical pixels is at least twice as tall as the modified vertical pixel is wide, wherein the masking at least a portion of the display comprises rotating the viewing orientation of the display by 90 degrees, masking at least a portion of each of the plurality of pixels, and offsetting the masked at least a portion of each of the plurality of pixels by a predetermined value.

32. A display comprising:
- a plurality of pixels wherein each of the pixels is less than twice as tall as the pixel is wide;
- at least one mechanism that modifies the display to create a plurality of modified vertical pixels by masking at least a portion of the display, wherein each of the modified vertical pixels is at least twice as tall as the modified vertical pixel is wide, wherein the masking at least a portion of the display comprises rotating the viewing orientation of the display by 90 degrees, masking at least a portion of each of the plurality of pixels, and offsetting the masked at least a portion of each of the plurality of pixels by a predetermined value;
- and at least one optical mechanism that modifies the display by shifting a perceived position of at least one row of sub-pixels of the display to create a plurality of modified vertical pixels, wherein each of the modified vertical pixels is at least twice as tall as the modified vertical pixel is wide.

* * * * *